US012489840B2

(12) United States Patent
Lu et al.

(10) Patent No.: US 12,489,840 B2
(45) Date of Patent: Dec. 2, 2025

(54) GRAPHICAL USER INTERFACE FOR A VOICE RESPONSE SYSTEM

(71) Applicant: Google LLC, Mountain View, CA (US)

(72) Inventors: Shi Lu, Foster City, CA (US); Sathish Karunakaran, Cupertino, CA (US); Naveen Kalla, San Diego, CA (US)

(73) Assignee: Google LLC, Mountain View, CA (US)

( * ) Notice: Subject to any disclaimer, the term of this patent is extended or adjusted under 35 U.S.C. 154(b) by 694 days.

(21) Appl. No.: 16/973,977

(22) PCT Filed: Jul. 16, 2018

(86) PCT No.: PCT/US2018/042289
§ 371 (c)(1),
(2) Date: Dec. 10, 2020

(87) PCT Pub. No.: WO2020/005302
PCT Pub. Date: Jan. 2, 2020

(65) Prior Publication Data
US 2021/0250438 A1 Aug. 12, 2021

Related U.S. Application Data

(60) Provisional application No. 62/691,701, filed on Jun. 29, 2018.

(51) Int. Cl.
H04M 1/72403 (2021.01)
G06F 3/0482 (2013.01)
(Continued)

(52) U.S. Cl.
CPC ...... H04M 1/72403 (2021.01); G06F 3/0482 (2013.01); G06F 3/167 (2013.01);
(Continued)

(58) Field of Classification Search
CPC ... H04M 1/72403; G06F 3/0482; G06F 3/167
See application file for complete search history.

(56) References Cited

U.S. PATENT DOCUMENTS 9,538,005 B1 * 1/2017 Nguyen ............... H04L 67/535
10,447,860 B1 * 10/2019 Hartman .............. H04M 7/006
(Continued)

FOREIGN PATENT DOCUMENTS

CN 101453525 6/2009
CN 103250402 8/2013
(Continued)

OTHER PUBLICATIONS

Bolella, "On-Device Video Subtitle Generation in SwiftUI", Mar. 19, 2020, 8 pages.
(Continued)

Primary Examiner — Barry W Taylor
(74) Attorney, Agent, or Firm — McDonnell Boehnen Hulbert & Berghoff LLP

(57) ABSTRACT

A system is described including a mobile device that receives a user request to initiate a phone call to an entity associated with an interactive-voice-response (IVR) interface of an IVR system. The system obtains information about a hierarchy of options associated with the interactive-voice-response system and causes a graphical user interface (GUI) for navigating the hierarchy of options associated with the interactive-voice-response system to be displayed at the mobile device. The system converts user inputs associated with the GUI to inputs recognized by the IVR system and the mobile device outputs, to the entity, the converted inputs and other information required by the entity to perform an operation based on the inputs. In response, the system updates the GUI based on additional information received from the IVR system.

22 Claims, 6 Drawing Sheets

(51) Int. Cl.
  *G06F 3/16* (2006.01)
  *G06N 20/00* (2019.01)
  *G06Q 20/32* (2012.01)
  *H04M 3/493* (2006.01)
  *H04L 65/1104* (2022.01)

(52) U.S. Cl.
  CPC ........... *G06N 20/00* (2019.01); *G06Q 20/326* (2020.05); *H04M 3/493* (2013.01); *H04L 65/1104* (2022.05)

(56) References Cited

U.S. PATENT DOCUMENTS

| | | | |
|---|---|---|---|
| 11,991,314 B1* | 5/2024 | Bosch | H04M 3/5175 |
| 2004/0120484 A1 | 6/2004 | Buzbee | |
| 2004/0121814 A1* | 6/2004 | Creamer | H04M 1/72469 455/566 |
| 2008/0159495 A1* | 7/2008 | Dahan | H04M 3/4938 379/93.01 |
| 2009/0141872 A1* | 6/2009 | Li | H04M 3/493 379/88.04 |
| 2012/0010869 A1 | 1/2012 | Mccarley et al. | |
| 2013/0094633 A1* | 4/2013 | Mauro | H04M 7/0039 379/88.01 |
| 2013/0108030 A1 | 5/2013 | Snir et al. | |
| 2014/0134979 A1 | 5/2014 | Sen et al. | |
| 2014/0270106 A1 | 9/2014 | Barlow | |
| 2015/0003604 A1* | 1/2015 | McCormack | H04M 3/5233 379/265.12 |
| 2015/0220619 A1* | 8/2015 | Gray | G06F 16/2246 707/738 |
| 2016/0028889 A1* | 1/2016 | Mittal | H04M 3/5133 379/265.09 |
| 2016/0337516 A1* | 11/2016 | Runyan | H04M 3/42263 |
| 2018/0041625 A1 | 2/2018 | Bi et al. | |
| 2019/0244606 A1 | 8/2019 | Baughman et al. | |
| 2019/0297184 A1* | 9/2019 | Chavez | H04M 7/0084 |
| 2024/0406313 A1* | 12/2024 | Tzur | H04M 3/5238 |

FOREIGN PATENT DOCUMENTS

| | | | | |
|---|---|---|---|---|
| CN | 105120117 | 12/2015 | | |
| CN | 105162996 | 12/2015 | | |
| CN | 105208228 | 12/2015 | | |
| CN | 106034184 | 10/2016 | | |
| CN | 106156012 | 11/2016 | | |
| CN | 106453219 | 2/2017 | | |
| CN | 106993089 | 7/2017 | | |
| CN | 106993104 A | * | 7/2017 | ........... G06K 9/6267 |
| KR | 20210028041 | 3/2021 | | |
| WO | 2020005302 | 1/2020 | | |

OTHER PUBLICATIONS

Kemler, et al., "On-Device and System-Wide Audio Live Captioning with Language Translation", Technical Disclosure Commons—https://www.tdcommons.org/dpubs_series4458, Jul. 19, 2021, 12 pages.

Tadmor-Ramanovich, et al., "On-Device Captioning with Live Caption", https://ai.googleblog.com/2019/10/on-device-captioning-with-live-caption.html, Oct. 29, 2019, 4 pages.

Wang, "Cascade RNN-Transducer: Syllable Based Streaming On-device Mandarin Speech Recognition with a Syllable-to-Character Converter", Nov. 17, 2020, 7 pages.

"Foreign Office Action", CN Application No. 201880094242.8, Oct. 21, 2021, 28 pages.

"Foreign Office Action", CN Application No. 201880094242.8, Dec. 24, 2021, 18 pages.

"International Search Report and Written Opinion", PCT Application No. PCT/US2018/042289, Mar. 22, 2019, 13 pages.

"International Preliminary Report on Patentability", Application No. PCT/US2018/042289, Dec. 29, 2020, 8 pages.

"Foreign Office Acton", CN Application No. 201880094242.8, Mar. 31, 2021, 29 pages.

* cited by examiner

GRAPHICAL USER INTERFACE FOR A VOICE RESPONSE SYSTEM

BACKGROUND

Many entities (e.g., businesses, governments, etc.) rely on interactive voice response (IVR) systems to handle incoming telephone traffic. An IVR system presents a caller with audible prompts and obtains dial tone multi frequency (DTMF) tones ("touch tones"), voice responses, or other user inputs, to navigate the caller between nodes of the IVR system. IVR systems typically require callers to navigate from a standard starting point in the IVR system (e.g., a greeting and menu) to a desired destination in the IVR system. The caller may be required to perform a lengthy engagement with a voice-recognition or touch-tone input system to traverse a series of intermediate nodes before ultimately reaching a destination node. In some cases, a user may simply want to speak to a human or perform a simple task. Yet some IVR systems may make performing even the simplest of tasks a challenge, which can lead to user frustration with, or general avoidance of, IVR systems.

SUMMARY

In general, techniques of this disclosure can be directed to ways of enhancing an existing IVR system with a graphical user interface (GUI) and other supporting features. An example system automatically builds a GUI, on top of an IVR system of an entity (e.g., a commercial business, a non-profit institution, a government office, or any other public or private entity that maintains an IVR system), from which a user can perform various tasks associated with the entity, that might be difficult, if not impossible, to perform using the IVR system alone. A computing device, such as a mobile phone, may obtain user input to initiate a telephone call with the entity. During the phone call, rather than present (or in addition to presenting) an audible interface to the IVR system, the computing device may display a GUI that is based on the menu hierarchy of the IVR system, but is also configured to receive non-spoken and non-touch-tone inputs (as an alternative or in addition to spoken and touch-tone inputs) to perform tasks with the IVR system, as well other more sophisticated tasks that stretch the capabilities of the IVR system and are made possible with the GUI. In some cases, the GUI may interface with other components (e.g., digital assistants, other applications, etc.) that execute at the entity or on the computing device, thereby enabling performance of even more complex or user specific tasks.

In this way, the techniques of this disclosure may provide for better user experience when engaging with an IVR system, in a manner that leverages a display and other capabilities of a modern computing device, to more quickly and better handle a specific user's needs. An example system, with reliance on a GUI, may perform a task based on fewer inputs and taking less time, than the number of spoken and touch-tone inputs and time required to perform a similar task using an IVR system alone. As such, through more efficient engagements with an IVR system, the described techniques may decrease the duration of calls into the IVR system thereby freeing up resources of the IVR system and a telecommunications network, to handle additional calls or perform other tasks. Beneficially, the IVR system itself can remain functional to operate independently if needed, enabling conventional interactions with devices where additional functionality is not available and/or needed. Accordingly, the techniques of the disclosure may combine the benefits of an IVR system while mitigating against perceived disadvantages (such as the inherently linear presentation of options through an audio interface).

Throughout the disclosure, examples are described where a computing device and/or computing system may analyze information (e.g., contextual information, user and/or device data, etc.). However, the system may only use the information after the computing device and/or the computing system receives explicit permission from a user of the computing device and/or the computing system. For example, in situations discussed below in which the computing device and/or computing system may collect information about user interactions with applications executing at computing devices or computing systems, individual users may be provided with an opportunity to provide input to control whether programs or features of the computing device and/or computing system can collect and make use of the information. The individual users may further be provided with an opportunity to control what the programs or features can or cannot do with the information.

In addition, information collected may be pre-treated in one or more ways before it is transferred, stored, or otherwise used by a computing device and/or computing system, so that personally-identifiable information is removed. For example, before an example computing system stores user interaction data associated with an application executing at a computing device, the example computing system may pre-treat the data to ensure that any user identifying information or device identifying information embedded in the data is removed. Thus, the user may have control over whether information is collected about the user and user's device, and how such information, if collected, may be used by the computing device and/or computing system.

In one example, a method is described that includes receiving, by a mobile device, a user request to initiate a phone call to an entity that relies on an interactive-voice-response system; obtaining information about a hierarchy of options associated with the interactive-voice-response system; outputting, by the mobile device, for display, a graphical user interface for navigating the hierarchy of options associated with the interactive-voice-response system; receiving, by the mobile device, one or more user inputs associated with the graphical user interface; converting the one or more user inputs associated with the graphical user interface to one or more corresponding inputs recognized by the interactive-voice-response system; outputting, by the mobile device, to the entity, an indication of the one or more corresponding inputs and other information required by the entity to perform an operation in response to the one or more corresponding inputs; and updating the graphical user interface based on additional information received by the mobile device, in response to outputting the indication of the one or more corresponding inputs and the other information.

In another example, a computer-readable storage medium is described including instructions that, when executed, cause at least one processor to perform operations including: receiving, by a mobile device, a user request to initiate a phone call to an entity that relies on an interactive-voice-response system; obtaining information about a hierarchy of options associated with the interactive-voice-response system; outputting, by the mobile device, for display, a graphical user interface for navigating the hierarchy of options associated with the interactive-voice-response system; receiving, by the mobile device, one or more user inputs associated with the graphical user interface; converting the one or more user inputs associated with the graphical user interface to one or more corresponding inputs recognized by the interactive-voice-response system; outputting, by the mobile device, to the entity, an indication of the one or more corresponding inputs and other information required by the entity to perform an operation in response to the one or more corresponding inputs; and updating the graphical user interface based on additional information received by the mobile device, in response to outputting the indication of the one or more corresponding inputs and the other information.

In another example, a computing system is described that includes at least one processor configured to perform operations including: receiving, by a mobile device, a user request to initiate a phone call to an entity that relies on an interactive-voice-response system; obtaining information about a hierarchy of options associated with the interactive-voice-response system; outputting, by the mobile device, for display, a graphical user interface for navigating the hierarchy of options associated with the interactive-voice-response system; receiving, by the mobile device, one or more user inputs associated with the graphical user interface; converting the one or more user inputs associated with the graphical user interface to one or more corresponding inputs recognized by the interactive-voice-response system; outputting, by the mobile device, to the entity, an indication of the one or more corresponding inputs and other information required by the entity to perform an operation in response to the one or more corresponding inputs; and updating the graphical user interface based on additional information received by the mobile device, in response to outputting the indication of the one or more corresponding inputs and the other information.

In another example, a system is described including means for receiving a user request to initiate a phone call to an entity that relies on an interactive-voice-response system; means for obtaining information about a hierarchy of options associated with the interactive-voice-response system; means for outputting, for display, a graphical user interface for navigating the hierarchy of options associated with the interactive-voice-response system; means for receiving one or more user inputs associated with the graphical user interface; means for converting the one or more user inputs associated with the graphical user interface to one or more corresponding inputs recognized by the interactive-voice-response system; means for outputting, to the entity, an indication of the one or more corresponding inputs and other information required by the entity to perform an operation in response to the one or more corresponding inputs; and means for updating the graphical user interface based on additional information received by the mobile device, in response to outputting the indication of the one or more corresponding inputs and the other information.

The details of one or more examples are set forth in the accompanying drawings and the description below. Other features, objects, and advantages of the disclosure will be apparent from the description and drawings, and from the claims.

DETAILED DESCRIPTION

Figure 1:
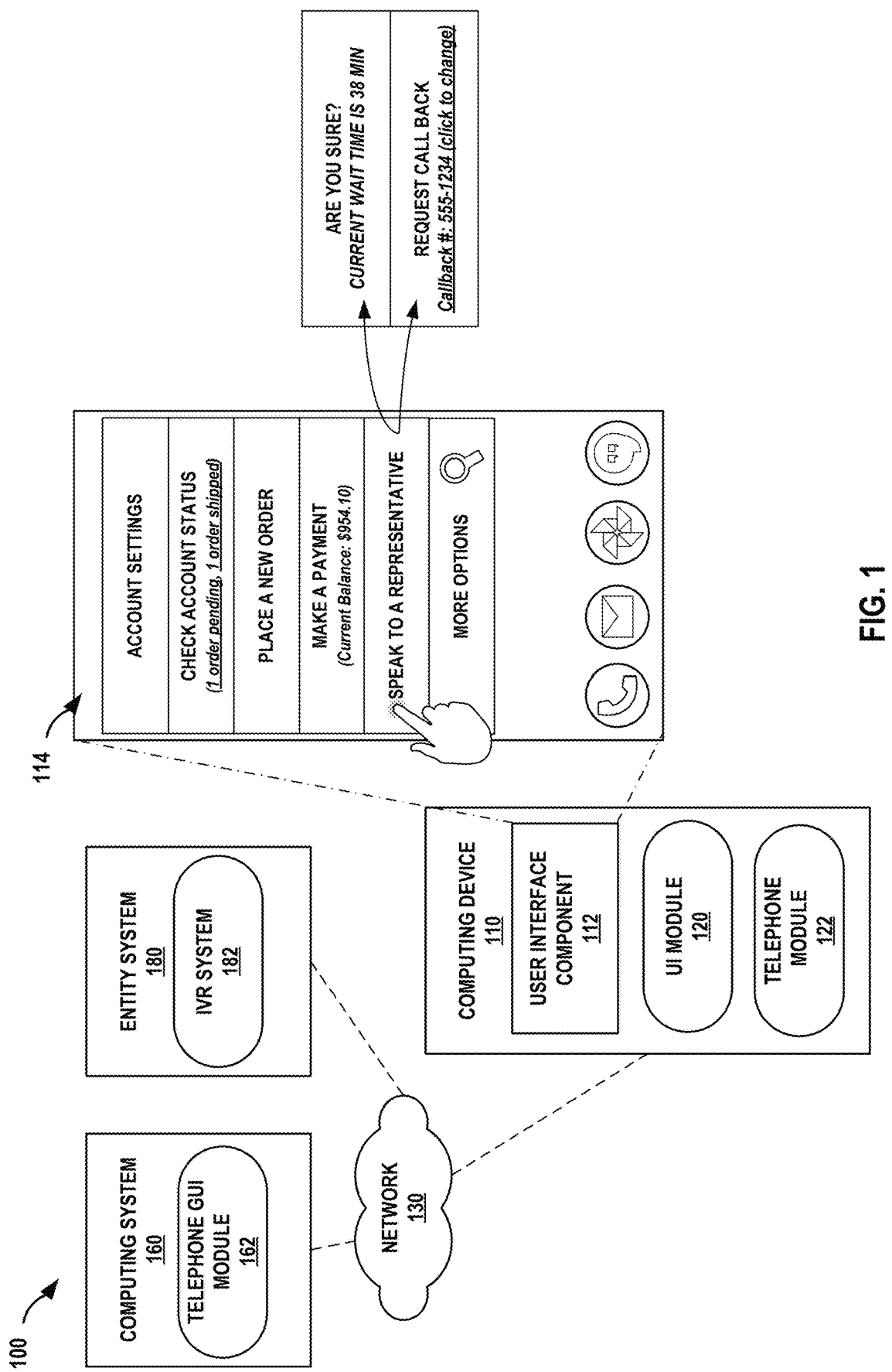
FIG. 1 is a conceptual diagram illustrating an example system configured to provide an enhanced user interface to an IVR system, in accordance with one or more aspects of the present disclosure.

FIG. 1 is a conceptual diagram illustrating an example system configured to provide an enhanced user interface to an interactive voice response (IVR) system, in accordance with one or more aspects of the present disclosure. System 100 of FIG. 1 includes computing device 110, entity system 180, and computing system 160, communicatively coupled to network 130. Although operations attributed to system 100 are described primarily as being performed by computing system 160, entity system 180, and computing device, in some examples, the operations of system 100 may be performed by additional or fewer computing devices and systems than what is shown in FIG. 1. For example, entity system 180 and computing device 110 may each include some or all of the functionality of computing system 160, or vice versa.

Network 130 represents any public or private communications network for transmitting data between computing systems, servers, and computing devices. Network 130 may be a public switched telephone network (PSTN), a wireless network (e.g., cellular, Wi-Fi®, and/or other wireless network), a wired network (e.g., a local area network (LAN), a wide area network (WAN), the Internet, etc.), an Internet Protocol (TP) telephony network, such as voice-over-TP (VOIP) network, or any other type of communications network. Network 130 may include one or more network hubs, network switches, network routers, or any other network equipment, that are operatively inter-coupled thereby providing for the exchange of information between computing system 160, entity system 180, and computing device 110. Computing system 160, entity system 180, and computing device 110 may transmit and receive data across network 130 using any suitable communication techniques.

Computing system 160, entity system 180, and computing device 110 may each be operatively coupled to network 130 using respective network links. The links coupling computing system 60, entity system 180, and computing device 110 to network 130 may be Ethernet, or other types of network connections, and such connections may be wireless and/or wired connections. In some examples, the links coupling Computing system 160, entity system 180, and computing device 110 to network 130 may be TP telephony links, such as VoIP or other similar telecommunications links. In some examples, the links coupling Computing system 160, entity system 180, and computing device 110 to network 130 may be TP Multimedia Subsystem (IMS) links using Session Initiated Protocol (SIP) signaling, circuit switched (CS) links, or other type of telecommunications links.

Entity system 180 represents any combination of one or more computers, mainframes, servers (including so-called "blades"), cloud computing systems, or other types of remote computing systems capable of exchanging information via network 130 to implement IVR system 182. That is, entity system 180 may store, or provide access to IVR system 182 being accessed directly by computing device 110, or indirectly via a GUI obtained from computing system 160.

Computing system 160 represents any combination of one or more computers, mainframes, servers (including so-called "blades"), cloud computing systems, or other types of remote computing systems capable of exchanging information via network 130 as part of an enhanced GUI service for IVR system 182 of entity system 180. That is, Computing system 160 may store, or provide access to, a service from which a client device can interact with IVR system 182 indirectly, via a GUI (e.g., user interface 114), rather than interact with IVR system 182 directly via a press-button or voice prompt interface. Computing system 160 may generate the GUI and output instructions to client devices for presenting and/or updating the GUI.

Computing device 110 represents any suitable computing device or computing system capable of exchanging information via network 130 to access the enhanced GUI service provided by Computing system 160 or IVR system 182 of entity system 180. For example, computing device 110 may be a mobile device from which a user provides inputs to call an entity, such as entity system 180, using an enhanced GUI experience provided by Computing system 160 instead of directly accessing IVR system 182 of entity system 80. Examples of computing device 110 include mobile phones, tablet computers, laptop computers, desktop computers, servers, mainframes, wearable devices (e.g., computerized watches etc.), home automation devices, assistant devices, gaming consoles and systems, media players, e-book readers, television platforms, automobile navigation or infotainment systems, or any other type of mobile, non-mobile, wearable, and non-wearable computing devices configured to exchange information via a network, such as network 130.

Computing system 160 includes telephone GUI module 162 and entity system 180 includes IVR system 182. Computing device 110 includes user interface (UI) module 120, telephone module 122, and further includes user interface component ("UIC") 112 which is configured to output user interface 114. Modules 120, 122, 162, and 182 may perform operations described herein using software, hardware, firmware, or a mixture of hardware, software, and firmware residing in and/or executing at one of computing device 110, computing system 160, and entity system 180. Computing device 110, computing system 160, and entity system 180 may execute modules 120, 122, 162, and 182 with multiple processors or multiple devices, as virtual machines executing on underlying hardware, as one or more services of an operating system or computing platform, and/or as one or more executable programs at an application layer of a computing platform. In some examples, computing device 110, computing system 160, and entity system 180 may download any of modules 120, 122, 162, and 182 from an application repository (e.g., an app store) or other database. In some examples, computing device 110, Computing system 160, and entity system 180 are preloaded with modules 120, 122, 162, and 182 during production and prior to being provided to a user.

While shown in FIG. 1 as computing system 160 including telephonic GUI module 162, entity system 180 including IVR system 182, and computing device 110 including UIC 112, UI module 120, and telephone module 122, modules 120, 122, 162, and 182 and the functionality thereof may be distributed differently between computing device 110, computing system 160, and entity system 180. As one example, in some instances, entity system 180 or computing device 110 may include all or part of the functionality of telephone GUI module 162.

UIC 112 of computing device 110 may function as an input and/or output device for computing device 110. UIC 112 may be implemented using various technologies. For instance, UIC 112 may function as an input device using presence-sensitive input screens, microphone technologies, infrared sensor technologies, or other input device technology for use in receiving user input. UIC 112 may function as output device configured to present output to a user using any one or more display devices, speaker technologies, haptic feedback technologies, or other output device technology for use in outputting information to a user. UIC 112 may be used by computing device 110 to output, for display, a GUI, such as user interface 114.

UI module 120 of computing device 110 controls UIC 112 including determining what UIC 112 presents and what information is exchanged between UIC 112 and other applications or components of computing device 110. For example, in controlling what UIC 112 displays, UI module 120 may receive information from a component of computing device 110 or computing system 160 that forms a basis for some or all of user interface 114. In response, UI module 120 may output instructions and information to UIC 112 that cause UIC 112 to display user interface 114 according to the information received from the component of computing device 110 or computing system 160. When handling input detected by UIC 112, UI module 120 may receive information from UIC 112 in response to inputs detected at locations of a presence-sensitive input component of UIC 112 that correspond to locations of a display component of UIC 112 at which elements of user interface 4 are displayed. UI module 120 disseminates information about inputs detected by UIC 112 to other components of computing device 110 for interpreting the inputs and for causing computing device 110 to perform one or more functions in response to the inputs.

In some examples, UI module 120 may receive an indication of one or more user inputs detected at UIC 112 and may output information about the user inputs to telephone module 122 or any other application or component of computing device 110 for which the user inputs are intended. For example, UIC 112 may detect a user input and send data about the user input to UI module 120. UI module 120 may generate one or more touch events based on the detected input. A touch event may include information that characterizes user input, such as a location component (e.g., [x,y] coordinates) of the user input, a time component (e.g., when the user input was received), a force component (e.g., an amount of pressure applied by the user input), or other data (e.g., speed, acceleration, direction, density, etc.) about the user input. Based on location information of the touch events generated from the user input, UI module 120 may determine that the detected user input is associated with telephone module 122 and may send an indication of the one or more touch events to telephone module 122 for further interpretation.

IVR system 182 of entity system 180 provides an interactive telephone menu capability to entity system 180. In other words, IVR system 182 may handle (at least some of) incoming telephone call traffic into entity system 180 from external devices, such as computing device 110. IVR system 182 may include a plurality of nodes corresponding to different operations, functions, or modes of entity system 180. IVR system 182 provides an interface connecting human customers of entity system 180 with people or systems (e.g., a voice messaging system) associated with entity system 180. A human customer or other user of IVR system 182 may interact with IVR system 182 via a telephone call to navigate the interactive menu of IVR system 182. For example, during a telephone call placed to entity system 180 from computing device 110, a user of computing device 110 may provide various voice responses or DTMF tones (sometimes referred to as "touch tones") to computing device 110 that get transmitted, via network 130, to entity system 180. Entity system 180 may use the voice responses or DTMF tones as inputs to IVR system 182 so as to cause IVR system 182 to transition from one node to a next node until IVR system 182 reaches a destination node. At the destination node, IVR system 182 may perform some operation or connect a user to an operator, such as a human or a machine (e.g., a bot, assistant, or other artificial intelligence (AT) based operator).

Telephone module 122 is a component of computing device 110 for handling telephone functionality of computing device 110. For example, telephone module 122 may be an application or component of a computing platform or operating system of computing device 110. Telephone module 122 may perform outbound calling operations, for instance, by initiating telephone calls with external devices, such as entity system 180. Telephone module 122 may handle incoming telephone calls as well, for example by performing operations to accept and support a telephone call between computing device 110 and the external device. Telephone module 122 may perform operations in furtherance of an existing telephone call as well, for example, by merging calls, placing calls on hold, accepting, rejecting, or forwarding calls, and other telephone related operations.

Telephone module 122 may cause UI module 120 to present a standard, telephone user interface associated with the telephone functionality of computing device 110. The user interface of telephone module 122 may include a numerical keypad from which a user can provide input to dial a telephone number. The user interface of telephone module 122 may include menus or options for performing telephone related tasks, such as playing voice messages, reviewing calling histories, looking up contacts in an electronic address book, and the like. Telephone module 122 may cause UI module 120 and UIC 112 to further present an enhanced telephone user interface, such as user interface 114, from which a user of computing device can more easily interact with an IVR system, such as that provided by entity system 180.

In general, telephone GUI module 162 of computing system 160 interacts with entity system 180 and computing device 110 to cause telephone module 122 to present user interface 114, i.e., an enhanced GUI associated with IVR system 182. In some examples, telephone GUI module 162 provides a service to one or more entity subscribers, such as entity system 180, in which each client that calls in to a particular entity subscriber is provided with an automatically generated GUI associated with an existing IVR system of that particular entity subscriber. By causing a computing device, such as computing device 110, to generate a supplemental IVR system GUI, such as user interface 114 or other similar GUI, telephone GUI module 162 may enable computing device 110 and other clients of entity system 180 to perform various tasks associated with entity system 180 that might be difficult, if not impossible, to perform using IVR system 182 alone. Telephone GUI module 162 may analyze information about inputs detected at user interface 114 and share the information with entity system 180, for further processing. Telephone GUI module 162 may analyze information obtained from IVR system 182 and entity system 180 and use the information to cause computing device 110 to update or change user interface 114. In this way, telephone GUI module 162 may enable computing device 110 to provide a better user experience when a user engages with IVR system 182, in a manner that leverages UIC 112 and other capabilities of computing device 110, to more quickly and better handle a specific user's needs.

In operation, computing device 110 may receive a user request to initiate a phone call to IVR system 182. For example, a user may provide input to UIC 112 that is interpreted by telephone module 122 as a command to establish a telecommunication session over network 130 with IVR system 182.

Prior to, or during the phone call, telephone GUI module 162 may obtain information about a hierarchy of options associated with an interactive-voice-response interface of IVR system 182. For example, telephone GUI module 162 may interact with entity system 180 to determine a list of options associated with IVR system 182, prompts or inputs that link one level of options to a next level, as well as other information associated with IVR system 182. In addition, telephone GUI module 162 may obtain other information about IVR system 182 and entity system 180, for example, an entity's hours of operation, days of operation, wait times or availability of operators associated with different nodes of IVR system 182, etc.

Telephone GUI module may create a map of the interface to IVR system 182 and subsequently rely on the map to build user interface 114. For example, telephone GUI module 162 may make a series of calls to different destination nodes within IVR system 182 to traverse the various different possible paths between nodes of IVR system 82, and may record the hierarchical relationships between the nodes, the prompts that occur at each node, and the voice or touch-tone responses used to advance to a different node. That is, telephone GUI module 162 may connect to IVR system 182 over a communication network, such as network 130. Telephone GUI module 162 may process information obtained from IVR system 182 (e.g., audio, IMS data, CS data, SIP signaling data, or other similar telecommunication information that includes signals for generating an enhanced GUI of IVR system 182). Telephone GUI module 162 may, for example, use voice recognition, machine-learning, or other voice/data processing techniques to interpret the information obtained from IVR system 182 as text or graphical representations that go into building user interface 114.

In some examples, entity system 180 may provide telephone GUI module 162 with information about IVR system 182 as a requirement to subscribing to the GUI generation service of telephone GUI module 162. For example, IVR system 182 may send an indication of a map of IVR system 182 to Computing system 160 via network 130.

IVR system 182 may exchange information over one or more communication channels established within network 130, between entity system 180 and Computing system 160. In some cases, a single communication channel between entity system 180 and computing system 160 is used to implement a telephone call and send additional information from which telephone GUI module 162 can use to generate user interface 114. At other times, a dedicated telephone channel and a different data channel between entity system 180 and computing system 160 are used. For instance, computing system 160 and entity system 180 may connect over the internet, or via a dedicated data channel established between systems 160 and 180 to exchange data for generating a GUI for IVR system 182.

Telephone GUI module 162 may refresh or update information about IVR system 182 over time, as changes are detected to IVR system 182 and/or in response to receiving updated information from IVR system 182 to alert computing system 160 of a change. Telephone GUI module 162 may perform periodic or occasional map validation operations, such as by reconnecting with IVR system 182 and reissuing previously used commands to determine whether different commands are needed to reach the nodes that are presently mapped to the previous commands. For instance, telephone GUI module 162 may, for each node, compare the information obtained from IVR system 182 at each node to expected information maintained by telephone GUI module 162. Telephone GUI module 162 may, for example, use voice recognition, machine-learning, or other voice/data processing techniques to determine whether, based on the information obtained from IVR system 182, user interface 114 needs updating and if so, how to update user interface 114 based on the updated information.

In continuing the preceding example, in operation, either prior to or during the phone call established between computing device 110 and IVR system 182, telephone GUI module 162 may send information to telephone module 122 that causes UIC 112 to display user interface 114. In other words, in response to the user request to initiate the phone call to IVR system 182, telephone module 122 or IVR system 182 may alert telephone GUI module 162 about the phone call and trigger telephone GUI module 162 to send telephone module 122 display instructions or other information needed by telephone module 122 to output user interface 114, for display. Based on the display instructions from telephone GUI module 162, computing device 110 may output, for display, user interface 114 for navigating the hierarchy of options associated with the interactive-voice-response interface of IVR system 182. For example, telephone module 122 may interpret the display instructions or other information obtained from telephone GUI module 162 to send a command to UI module 120 for causing UIC 112 to display user interface 114.

As shown in the example of FIG. 1, user interface 4 includes various graphical indications of nodes of IVR system 182. For example, user interface 114 includes a respective graphical indication of an account settings node, an account status node, a new order node, a make payment node, a speak to representative node, a request call back node, as well as a more options or search node. May other types of nodes exist and many different graphical representation of such nodes are possible. User interface 114 may include text, images, graphics, video, audio, or other features associated with each graphical representation of each node.

Computing device 110 may receive one or more user inputs associated with user interface 114. For example, a user may select the speak to representative node by providing a touch or gesture input at or near a location at which UIC 112 displays the graphical representation of the speak to representative node or a voice input detected by UIC 112. UI module 120 may recognize the input and send information about the input to telephone module 122 for interpretation with regard to user interface 114.

Computing device 110 may convert the one or more user inputs associated user interface 114 to one or more corresponding inputs associated with IVR system 182. For example, using the information provided by telephone GUI module 162 for reproducing user interface 114 on computing device 110, telephone module 122 may map the user inputs to functions or commands that are recognizable by IVR system 182 for taking an appropriate action based on the user inputs. For example, telephone module 122 may determine a touch-tone, voice prompt, SIP signal, circuit-switched command, or other command that will causes IVR system 182 to connect computing device 110 to the appropriate IVR system node.

Computing device 110 may output, via a telecommunication session established to implement the phone call, to the entity, an indication of the one or more corresponding inputs. For example, telephone module 122 may communicate the corresponding inputs determined by telephone module 122 to IVR system 182 to cause IVR system 182 to connect computing device 110 with the appropriate node of IVR system 182 (e.g., the node that transfers a caller to an operator of entity system 180). For example, telephone module 122 may send the determined touch-tone, voice prompt, SIP signal, CS command, or other command to IVR system 182 that causes IVR system 182 to connect the phone call established between computing device 110 and IVR system 182 to the appropriate IVR system node.

Computing device 110 may receive additional information about the hierarchy of options associated with the interactive-voice-response interface and update user interface 114 based on the additional information. For example, prior to the user inputs detected at the speak to representative graphical representation of user interface 114, telephone GUI module 162 and telephone module 122 may have no information about a current wait time associated with IVR system 182. In some examples, via a SIP signal pulled from IMS data associated with the phone call between computing device 110 and entity system 180, telephone module 122 may determine, as additional information, the current wait time associated with the selected node of IVR system 182. In some examples, an assistant service accessible to computing device 110 may determine the wait time based on observations of wait times of other users of IVR system 182 or other similar systems. In any event, telephone module 122 may determine, as additional information, the current wait time associated with the selected node of IVR system 182. Telephone module 122 may cause UI module 120 and UIC 112 to update user interface 114 to reflect the current wait time as well as an alternative node option with IVR system 182 (e.g., a call back option). UIC 112 may output graphical representations of the wait time and alternative node as part of user interface 114 and the user of computing device 110 may continue the interaction with IVR system 182 by provided additional inputs to user interface 114, e.g., to either be placed on hold to speak to a representative or to terminate the phone call with a request that IVR system 182 call-back when the current wait time is less than a time threshold (e.g., zero or more minutes, seconds, etc.)

As such, with reliance on the described techniques of this disclosure, a system may provide a GUI generation service through which the system may perform IVR related tasks based on fewer user inputs or in less time, than the number of spoken and touch-tone inputs and time required to perform a similar task using a traditional user interface of other IVR systems. As such, the described techniques may decrease the duration or quantity of incoming communications received by an IVR system, with the potential of freeing up resources of the IVR system and the communication network used to communicate with the IVR system, thereby enabling the IVR system and the communication network to handle additional calls or perform other tasks than would otherwise be possible.

In some examples, with reliance on the described techniques of this disclosure, a system may enable more reliable business calls. That is, since an interaction with an IVR system may require a complex input, such as a multi-digit DTMF input (e.g., to input a credit card number, etc.), the described techniques may reduce inaccurate inputs as they might enable an IVR system to provide a more intuitive interface that is less likely receive incorrect inputs, and a user may verify the accuracy of their input visually before submitting it to the IVR system. In addition, providing such information via a GUI interface rather than via a voice prompt may be more secure.

In some examples, with reliance on the described techniques of this disclosure, a system may not need to first try to identify an input language (e.g., English, Spanish, etc.) before providing the enhanced GUI. That is, using enhanced SIP signals as those described herein, an IVR system may identify a user's preferred language based on a SIP signal received from a user device that is indicative of their language preference and therefore avoid providing a welcoming announcement in multiple languages.

Figure 2:
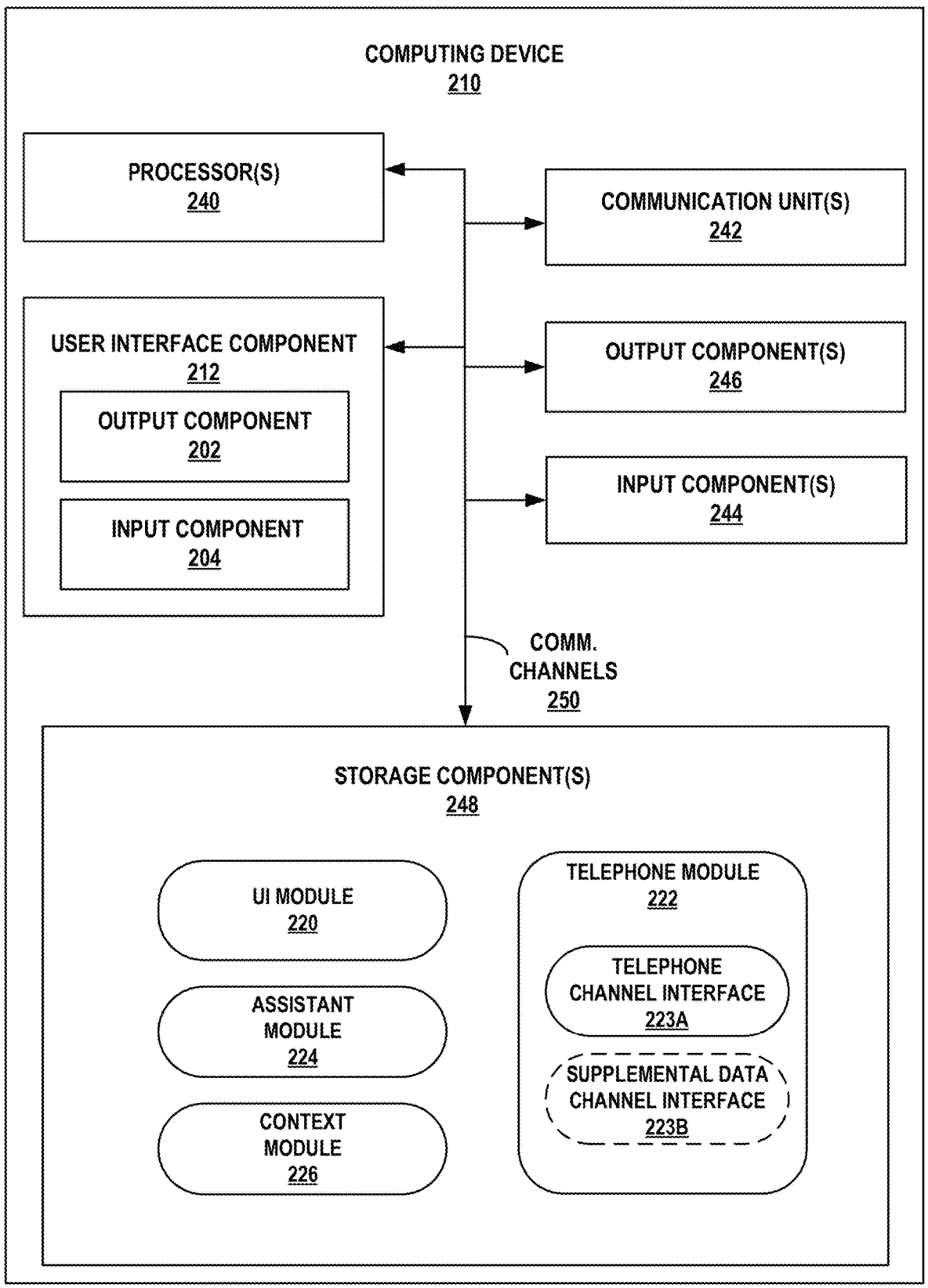
FIG. 2 is a block diagram illustrating an example computing device configured to provide an enhanced user interface to an IVR system, in accordance with one or more aspects of the present disclosure.

FIG. 2 is a block diagram illustrating an example computing device configured to provide an enhanced user interface to an interactive-voice-response system, in accordance with one or more aspects of the present disclosure. FIG. 2 is described in the context of FIG. 1. For example, computing device 210 of FIG. 2 is an example of computing device 110 of FIG. 1. FIG. 2 illustrates only one particular example of computing device 210, and many other examples of computing device 210 may be used in other instances and may include a subset of the components included in example computing device 210 or may include additional components not shown in FIG. 2.

As shown in the example of FIG. 2, computing device 210 includes user interface component (UIC) 212, one or more processors 240, one or more communication units 242, one or more input components 244, one or more output components 246, and one or more storage components 248. UIC 212 includes output component 202 and input component 204. Storage components 248 of computing device 210 includes UI module 220, assistant module 224, context module 228, and telephone module 222. Telephone module 122 includes telephone channel interface 223A and supplemental data channel interface 223B.

Communication channels 250 may interconnect each of the components 212, 240, 242, 244, 246, and 248 for inter-component communications (physically, communicatively, and/or operatively). In some examples, communication channels 250 may include a system bus, a network connection, an inter-process communication data structure, or any other method for communicating data.

One or more communication units 242 of computing device 210 may communicate with external devices via one or more wired and/or wireless networks by transmitting and/or receiving network signals on the one or more networks. Examples of communication units 242 include a network interface card (e.g. such as an Ethernet card), an optical transceiver, a radio frequency transceiver, a GPS receiver, or any other type of telecommunication device that can send and/or receive information over a network, such as network 130 of FIG. 1. Other examples of communication units 242 may include short wave radios, cellular voice or data radios, wireless network radios, as well as universal serial bus (USB) controllers, VoIP type, IMS type, and CS type telephone transceivers, and other telephone devices.

One or more input components 244 of computing device 210 may receive input. Examples of input are tactile, audio, and video input. Input components 242 of computing device 210, in one example, includes a presence-sensitive input device (e.g., a touch sensitive screen, a PSD), mouse, keyboard, voice responsive system, video camera, microphone or any other type of device for detecting input from a human or machine. In some examples, input components 242 may include one or more sensor components one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., microphone, camera, infrared proximity sensor, hygrometer, and the like). Other sensors may include a heart rate sensor, magnetometer, glucose sensor, hygrometer sensor, olfactory sensor, compass sensor, step counter sensor, to name a few other non-limiting examples.

One or more output components 246 of computing device 110 may generate output. Examples of output are tactile, audio, and video output. Output components 246 of computing device 210, in one example, includes a PSD, sound card, video graphics adapter card, speaker, cathode ray tube (CRT) monitor, liquid crystal display (LCD), or any other type of device for generating output to a human or machine.

UIC 212 of computing device 210 may be similar to UIC 112 of computing device 110 and includes output component 202 and input component 204. Output component 202 may be a display component, such as a screen at which information is displayed by UIC 212 and input component 204 may be a presence-sensitive input component, such as a touch of capacitive sensor, that detects an object at and/or near output component 202. Output component 202 and input component 204 may be a speaker and microphone pair or any other combination of one or more input and output components, such as input components 244 and output components 244. In the example of FIG. 2, UIC 212 may present a user interface (such as user interface 114 of FIG. 1).

As one example range, presence-sensitive input component 204 may detect an object, such as one or more fingers, a stylus, or one or more other inputs units that are within two inches or less of output component 202. Input component 204 may determine a location (e.g., an [x, y] coordinate) of output component 202 at which the object was detected. In another example range, input component 204 may detect an object six inches or less from output component 202 and other ranges are also possible. Input component 204 may determine the location of output component 202 selected by a user's finger using capacitive, inductive, and/or optical recognition techniques. In some examples, input component 204 also provides output to a user using tactile, audible, or visual stimuli as described with respect to output component 202.

UIC 212 of computing device 210 may detect two-dimensional and/or three-dimensional gestures as input from a user of computing device 210. For instance, a sensor of UIC 212 may detect a user's movement (e.g., moving one or more hands, arms, fingers, other body parts, pens, styluses, etc.) within a threshold distance of the sensor of UIC 212. UIC 212 may determine a two- or three-dimensional vector representation of the movement and correlate the vector representation to a gesture input (e.g., a hand-wave, a pinch, a clap, a pen stroke, etc.) that has multiple dimensions. In other words, UIC 212 can detect a multi-dimension gesture without requiring the user to gesture at or near a screen or surface at which UIC 212 outputs information for display. Instead, UIC 212 can detect a multi-dimensional gesture performed at or near a sensor which may or may not be located near the screen or surface at which UIC 212 outputs information for display.

While illustrated as an internal component of computing device 210, UIC 212 may also represent an external component that shares a data path with computing device 210 for transmitting and/or receiving input and output. For instance, in one example, UIC 212 represents a built-in component of computing device 210 located within and physically connected to the external packaging of computing device 210 (e.g., a screen on a mobile phone). In another example, UIC 212 represents an external component of computing device 210 located outside and physically separated from the packaging or housing of computing device 210 (e.g., a monitor, a projector, etc. that shares a wired and/or wireless data path with computing device 210).

One or more storage components 248 within computing device 210 may store information for processing during operation of computing device 210 (e.g., computing device 210 may store data accessed by modules 220, 222, 224, and 226 and operating platform 228 during execution at computing device 210). In some examples, storage component 248 is a temporary memory, meaning that a primary purpose of storage component 248 is not long-term storage. Storage components 248 on computing device 210 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with modules 220, 222, 224, and 226. Storage components 248 may include a memory configured to store data or other information associated with notification queue 232, modules 220, 222, 224, and 226.

One or more processors 240 may implement functionality and/or execute instructions associated with computing device 210. Examples of processors 240 include application processors, display controllers, auxiliary processors, one or more sensor hubs, and any other hardware configure to function as a processor, a processing unit, or a processing device. Modules 220, 222, 224, and 226 may be operable by processors 240 to perform various actions, operations, or functions of computing device 210. For example, processors 240 of computing device 210 may retrieve and execute instructions stored by storage components 248 that cause processors 240 to perform the operations described herein that are attributed to modules 220, 222, 224, and 226. The instructions, when executed by processors 240, may cause computing device 210 to store information within storage components 248.

UI module 220 may include all functionality of UI module 120 of computing device 110 of FIG. 1 and may perform similar operations as UI module 120 for managing a user interface (e.g., user interface 114) that computing device 210 provides at UIC 212 for handling input from, and output to, a user. For example, UI module 220 may generate instructions or commands, based on commands or instructions received from telephone module 222 to cause UIC 212 to display user interface 114 and the elements thereof. UI module 220 may be part of or associated with an operating platform of computing device 210. For example, UI module 220 may be a sub-module, service, or activity of an operating system of computing device 210 as opposed to being a module or application of computing device 210 that is separate from the computing platform or operating system computing device 210.

Assistant module 224 and context module 226 are components of computing device 210 that are configured to collect and provide additional information to telephone module 222 to enable telephone module 222 to provide an enhanced GUI experience for an IVR system, such as IVR system 182 of FIG. 1. Other components of computing device 210, and other external devices or systems, such as computing system 160 and entity system 180 of FIG. 1, may similarly obtain additional information from assistant module 224 and context module 226 to support an enhanced GUI service, for example, like the service provided by system 100 of FIG. 1. Assistant module 224 outputs information obtained about computing device 110 or a user of computing device 110, through interactions with the user and an assistant service provided by assistant module 224, and context module 226 outputs contextual information associated with computing device 110 or a user of computing device 110.

Context module 226 may process and analyze contextual information associated with computing device 210. In some cases, context module 226 may process contextual information to define a context of computing device 210 or a context of a user of computing device 210.

As used throughout the disclosure, the term "contextual information" refers to any conceivable information that may be used by a computing system and/or computing device, such as computing device 210, to provide an enhanced GUI service during a telephone call to an IVR system. Contextual information may include: device location and/or sensory information, user topics of interest (e.g., a user's favorite "things" typically maintained as a user interest graph or some other type of data structure), contact information associated with users (e.g., a user's personal contact information as well as information about a user's friends, co-workers, social media connections, family, etc.), search histories, location histories, long-term and short-term tasks, calendar information, application usage histories, purchase histories, items marked as favorites, electronic bookmarks, and other information that computing device 210 can gather about a user of computing device 210 from interactions with computing device 210.

Furthermore, contextual information may include information about the operating state of a computing device. For example, an application that is executed at a given time or in a particular location is an example of information about the operating state of a computing device. Other examples of contextual information that is indicative of an operating state of a computing device include, but are not limited to, positions of switches, battery levels, whether a device is plugged into a wall outlet or otherwise operably coupled to another device and/or machine, user authentication information (e.g., which user is currently authenticated-on or is the current user of the device), whether a device is operating in "airplane" mode, in standby mode, in full-power mode, the operational state of radios, communication units, input devices and output devices, etc.

In contrast to "contextual information" the term "context" refers to a particular state of each characteristic from a collection of characteristics associated with a computing device and/or a user of a computing device, at a particular time. The context may indicate characteristics associated with the physical and/or virtual environment of the user and/or the computing device at a particular location and/or time. As some examples, a context of a computing device may specify an acoustic fingerprint, a video fingerprint, a location, a movement trajectory, a direction, a speed, a name of a place, a street address, a type of place, a building, weather conditions, and traffic conditions, at various locations and times. As some additional examples, the context of a computing device may specify a calendar event, a meeting, or other event associated with a location or time.

In some examples, a context of a computing device may specify any webpage addresses accessed at a particular time, one or more text entries made in data fields of the webpages at particular times, including search or browsing histories, product purchases made at particular times, product wish lists, product registries, and other application usage data associated with various locations and times. The context of the computing device may further specify audio and/or video accessed by or being broadcast in the presence of the computing device at various locations and times, television or cable/satellite broadcasts accessed by or being broadcast in the presence the computing device at various locations and times, and information about other services accessed by the computing device at various locations and times.

When collecting, storing, and using contextual information or any other user or device data, computing device 210 takes precautions to ensure that user privacy is preserved. That is, computing device 210 may only collect, store, and analyze contextual information if computing device 210 receives explicit permission of individual users from which the contextual information originates. For example, in situations in which computing device 210 may collect information for providing an enhanced GUI experience for an IVR system, a user of computing device 210 may be provided with an opportunity to provide input to computing device 210 to control whether computing device 210 can collect and make use of their information. The individual users may further be provided with an opportunity to control what computing device 210 can or cannot do with the information.

Any data being collected by computing device 210 may be pre-treated in one or more ways before it is transferred to, stored by, or otherwise used by computing device 210, so that personally-identifiable information is removed. For example, before computing device 210 collects contextual information computing device 210 may pre-treat the contextual information to ensure that any user identifying information or device identifying information embedded in the contextual information is removed before being stored by computing device 210 or transferred to an external computing device or system. The user has complete control over whether contextual information is collected, and if so, how such information may be used by computing device 210.

Assistant module 224 provides computing device 210 with access to intelligent, digital assistant services and capabilities. In some cases, assistant module 224 may output assistant information associated with a user that is used by telephone module 222 to provide an enhanced GUI service for an IVR system.

Assistant module 224 is an intelligent assistant component configured to satisfy user input (e.g., spoken utterances, textual input, etc.) received from a user of computing device 210. Assistant module 124 may execute locally at computing device 210, or in some examples, assistant module 124 is an interface (e.g., application programming interface or "API") to an assistance service executing remotely, e.g., in a cloud computing environment.

Assistant module 224 enables computing device 210 to receive natural language inputs (e.g., conversations) to carry out "real world" tasks via computing device 210. Assistant module 224 may be programmed or may adapt over time to learn how, and complete specific tasks, such as scheduling certain types of appointments. For such tasks, the assistant module 224 performed natural language processing techniques of user inputs (e.g., spoken, typed, etc.) to make the user experience as natural as possible, allowing users to type or speak normally, like they would to another human being, and without having to adapt their language to a language of a machine.

Assistant module 224 may include one or more software agents (e.g., also referred to as "agents") configured to perform specialized assistant related tasks or services for an individual, such as a user of computing device 210. The agents of assistant modules 224 may perform tasks or services based on user input (e.g., detected at UIC 212), location awareness (e.g., based on context information received from context module 226), and/or the ability to access other information (e.g., weather or traffic conditions, news, stock prices, sports scores, user schedules, transportation schedules, retail prices, etc.) from a variety of information sources (e.g., either stored locally at computing device 210, stored remotely, or obtained via a search service (e.g., accessible via the internet). Assistant modules 224 may perform machine learning or artificial intelligence techniques to automatically identify and complete one or more tasks on behalf of a user.

Telephone module 222 may include all functionality of telephone module 122 of computing device 110 of FIG. 1 and may perform similar operations as telephone module 122 for handling telephone functionality of computing device 210. As part of handling telephone functionality, telephone module 222 may communicate with external systems and devices, such as computing system 160 and entity system 180, to provide a GUI for interacting with an IVR system, such as IVR system 182. Telephone module 222 may communicate with UI module 220, assistant module 224, and context module 226, to provide the GUI for interacting with the IVR system.

Telephone module 222 is configured to enable computing device 210 to interact with telephone services provided over a telecommunications network, such as network 130 (e.g., a CS network, an TP packet-switched network, etc.). Additionally, or alternatively, telephone module 222 is configured to enable computing device 210 to interact with telephone services provided over the internet according to one or more public or private communication protocols and standards. Telephone module 222 may initiate and receive telephone calls on behalf of computing device 210. For example, telephone module 222 may interact with communication units 242 exchange telephone information over network 130.

Telephone module 222 includes telephone channel interface 223A and, in some examples, supplemental data channel interface 223B. Collectively referred to as "interfaces 223", telephone channel interface 223A and supplemental data channel interface 223B enable telephone module 222 to communicate information to an external entity, such as entity system 180.

Telephone module 222 may use telephone channel interface 223A to exchange voice-call information for enabling computing device 210 to conduct a digital telephone call with the external entity. For example, telephone module 222 may encode, decode, interpret, and execute operations in response to one or more commands or signals that are embedded in a voice data stream being exchanged between computing device 210 and an external entity, such as entity system 180, during a digital telephone call between computing device 210 and the external entity. Telephone module 222 may process a voice call data stream in accordance with IMS and SIP, VoIP, or other telecommunication protocols. Telephone module 222 may utilize telephone channel interface 223A to send DTMF codes, verbal responses, IMS and SIP messaging, or other inputs to IVR system 182.

In some instances, in addition to telephone channel interface 223A, telephone module 222 may include supplemental data channel interface 223B to exchange, with other computing systems in furtherance of an IVR system GUI service, other information beyond the types of information already being received via telephone channel interface 223A. Examples of other information can include: contextual information, payment or transaction information, user information, information about computing device 210, as well as other types of information. Telephone module 222 may utilize supplemental data channel interface 223B to send information, other than the DTMF codes, verbal responses, or other inputs to IVR system 182 that are sent by telephone module 222 using interface 223A. As an example, telephone module 222 may exchange information with IVR system 182 that enables IVR system 182 to perform an operation that is outside a typical capability of IVR system 182. For example, an operation that requires more information than what can be exchanged using DTMF codes or IMS and SIP messaging.

In some examples, a telephone survey may benefit from the techniques of this disclosure. That is, in a telephone survey, an IVR system may contact a user's mobile device and typically request the user to "Using your touchtone keypad, provide a response to the following questions where pressing '0' is a negative response and pressing '1' is a positive response" or the IVR system may prompt the user to input "a satisfaction" where '0' is very unsatisfied, '1' is mostly unsatisfied, '2' is indifferent, '3' is somewhat satisfied, and '4' is very satisfied. Prompting a user for each question again and again may produce a very long, boring, time consuming survey. Whereas the techniques of this disclosure may enable the mobile phone to automatically provide a GUI based survey to improve the user experience and make collecting survey responses more efficient.

Telephone module 222 may obtain the other information from computing system 160, entity system 180, or other device or system of an IVR system GUI service provider. Telephone module 222 may output the other information to computing system 160, entity system 180, or other device or system of an IVR system GUI service provider. Telephone module 222 may, obtain from module 224 and/or module 226, or share with module 224 and/or module 226, portions of the other information that telephone module 222 exchanges with computing system 160, entity system 180, or other device or system of an IVR system GUI service provider. For example, telephone module 222 may send, to computing system 160 or entity system 180, assistant generated information obtained from assistant module 224. In some cases, telephone module 222 may send, to computing system 160 or entity system 180, context information collected by context module 226.

Figure 3:
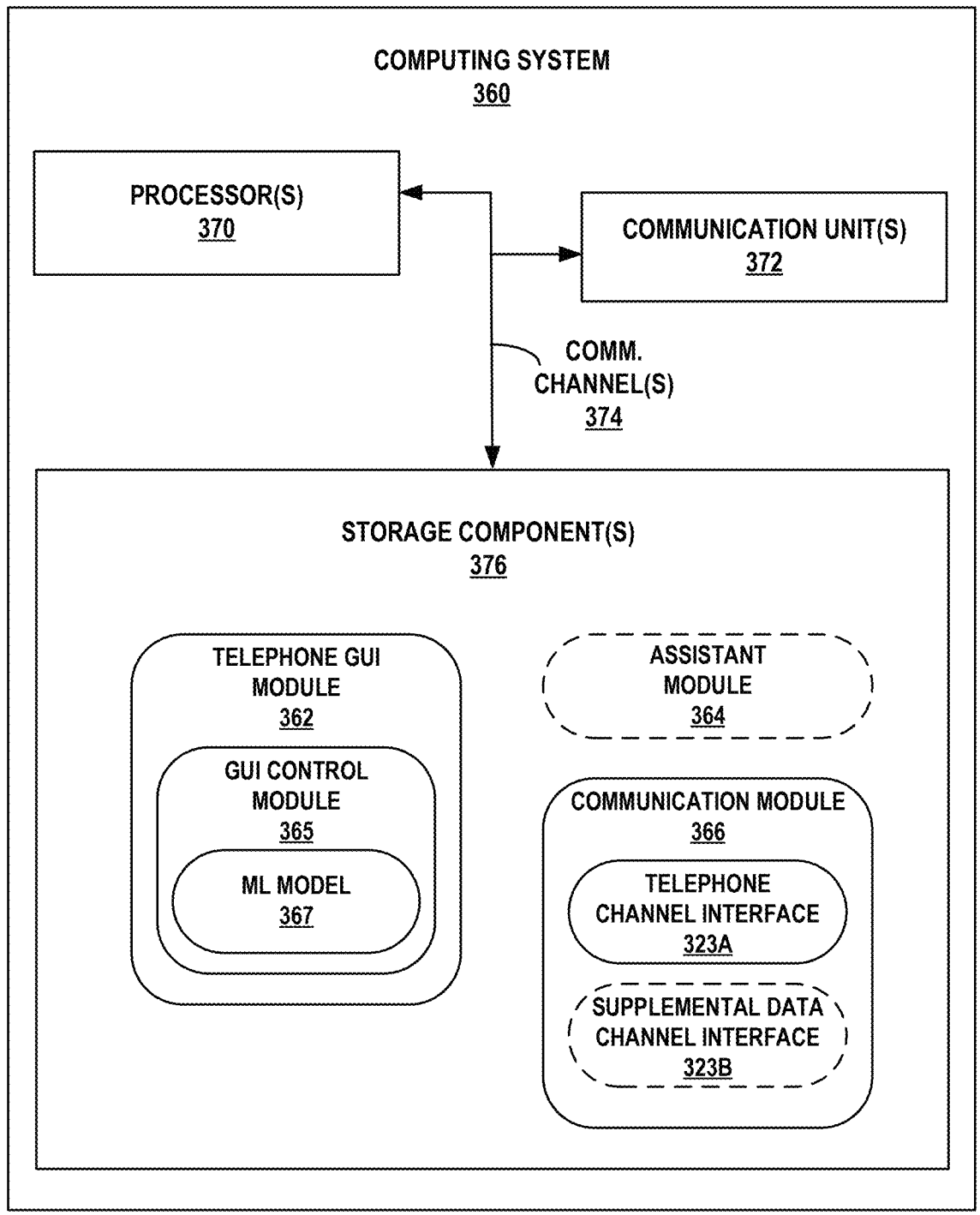
FIG. 3 is a block diagram illustrating an example computing system configured to provide an enhanced user interface to an IVR system, in accordance with one or more aspects of the present disclosure.

FIG. 3 is a block diagram illustrating an example computing system configured to provide an enhanced user interface to an interactive-voice-response system, in accordance with one or more aspects of the present disclosure. FIG. 3 is described in the context of FIG. 1. For example, computing system 360 of FIG. 3 is an example of computing system 160 of FIG. 1. FIG. 3 illustrates only one particular example of computing system 160, and many other examples of computing system 160 may be used in other instances and may include a subset of the components included in example computing system 160 or may include additional components not shown in FIG. 3.

Computing system 360 includes one or more processors 370, one or more communication units 372, and one or more storage components 376, all communicatively coupled via one or more communication channels 374. Processors 370, communication units 372, storage components 376, and communication channels 374 are similar to, respectively, processors 240, communication units 242, communication channels 250, and storage components 248 of computing device 210.

One or more storage components 376 include telephone GUI module 362, communication module 366, and optionally, assistant module 364. Telephone GUI module 362 includes GUI control module 365, including machine-learned (ML) model 367. Communication module 366 includes telephone channel interface 323A and supplemental data channel interface 323B.

Assistant module 364 may be similar to assistant module 224 of computing device 210 in that assistant module 364 provides computing system 360 with access to intelligent, digital assistant services and capabilities. In some cases, assistant module 364 may output assistant information associated users of computing devices that access an enhanced GUI service for an IVR system that is managed by telephone GUI module 362. Assistant module 364 may communicate with assistant module 224 of computing device 210, or other assistant service provider, to obtain other information required by telephone GUI module 362 for an enhanced IVR system GUI or required by an IVR system, such as IVR system 182, for performing an operation. For example, assistant module 364 may distribute user specific information maintained by assistant module 264, or accessible to assistant module 264 (e.g., maintained by a mobile payment application executing at computing device 210) to telephone GUI module 362 or IVR system 182. Assistant module 364 may distribute, to telephone GUI module 362 or IVR system 182, user specific information, e.g., besides just a name or telephone number of a user, maintained by assistant module 264 or accessible to assistant module 264 (e.g., while being maintained by a mobile payment application executing at computing device 210 or in a cloud environment that is accessible via network 130).

Communication module 366 is configured to control communication units 372 to manage one or more network communication interfaces of computing system 360. Communication module 366 includes telephone channel interface 323A and, optionally includes supplemental data channel interface 323B (collectively "interfaces 323").

Interfaces 323 are similar to interfaces 223 of telephone module 222 of computing device 210. That is, communication module 366 may send and/or receive telephone information via telephone channel interface 323A. Communication module 366 may send and/or receive other information via supplemental data channel interface 323B. Communication module 366 may exchange (send and/or receive) information via interfaces 323, on behalf of assistant module 364 and telephone GUI module 362, as part of the service provided by telephone GUI module 362.

Telephone GUI module 362 manages a network accessible, IVR system GUI service. Telephone GUI module 362 is similar to, and may include at least some of the same functionality as, telephone GUI module 162 of computing system 160. That is, telephone GUI module 362 may interact with communication module 366 and communication units 372 to communicate with external entities (e.g., entity system 180) and external devices (e.g., computing devices 110, 210) to facilitate an enhanced GUI experience at the external devices when the external devices call IVR systems of the external entities.

GUI control module 365 of telephone GUI module 362 outputs instructions for producing an IVR system GUI at a computing device, such as computing devices 110, 210. GUI control module 365 may generate the instructions from information received from communication module 366 and/or assistant module 364. For example, GUI control module 365 may observe IMS data obtained via telephone channel interface 323A. The IMS data may be part of an IMS data stream occurring during a telephone call between a subscribing entity and/or computing device. GUI control module 365 may include one or more rules or filters for identifying SIP signals within the IMS data that, when identified, may cause a change or update to information contained in an IVR system GUI.

GUI control module 365 may obtain additional information about a user of a computing device, such as a user of computing devices 110, 210, in order to generate instructions for producing an IVR system GUI at the computing device. With explicit permission from the user associated with the additional information, GUI control module 365 may cause telephone GUI module 362 to share the additional information with a subscribing entity system, such as entity system 180, to enable the entity system to perform an operation that would otherwise be impossible, if not at least more difficult, to perform without the additional information. In cases where computing system 360 includes assistant module 364, GUI control module 365 may communicate with assistant module 364 to obtain at least some of the additional information about a computing device. In some cases, GUI control module 365 interfaces with external entities and computing devices to obtain the additional information about a computing device. For example, GUI control module 365 may communicate with IVR system 182 of entity system 180 and/or telephone modules 122, 222 of computing devices 110, 210 to obtain the additional information about a computing device of a user.

GUI control module 365 may obtain additional information about an entity system or IVR system, such as entity system 180 and IVR system 182, in order to generate instructions for producing an IVR system GUI associated with the IVR system at a computing device of a user. GUI control module 365 may cause telephone GUI module 362 to share the additional information with a computing device, such as computing devices 110, 210, to enable the computing device to update or change information presented in an IVR system GUI. In cases where computing system 360 includes assistant module 364, GUI control module 365 may communicate with assistant module 364 to obtain at least some of the additional information about a computing device. In some cases, GUI control module 365 interfaces with external entities and computing devices to obtain the additional information about a subscribing entity. For example, GUI control module 365 may communicate with IVR system 182 of entity system 180 and/or telephone modules 122, 222 of computing devices 110, 210 to obtain the additional information about IVR system 182.

In some examples, the additional information that GUI control module 365 collects about an entity system or IVR system includes status information associated with various nodes of the IVR system, including: expected wait times to connect to a node, average wait times to connect to a node, actual wait time waiting to connect to a node, caller's account status information, caller's order status information, order shipping information, item or service cost and availability information, and the like. In some examples, just like dynamic status information, the additional information may include static information, such as directory information, technical support recommendations, as well as other types of additional information that may or may not change over time. Aside from obtaining additional information about a user of a computing device or an IVR system of an entity, GUI control module 365 may make predictions about the user or the IVR system.

Machine-learning (ML) model 367 is a machine-learned model that is trained based on past phone calls between one or more computing devices, such as computing devices 110, 210 and other devices, and one or more IVR systems, including IVR system 182 and other IVR systems, to make predictions about a user and an IVR system. In some implementations, ML model 367 is trained to receive input data of one or more types and, in response, provide output data of one or more type. An example of input data and corresponding output data includes previously observed wait times to traverse a portion of an IVR system's nodes and corresponding rules for deriving expected wait times to make a traversal in the future, for a given context. Another example of input data and corresponding output data includes previously traversed paths through an IVR system's nodes and a corresponding program that predicts future paths through various nodes of the IVR system, for a given context.

In any event, the input data may include one or more features that are associated with an instance, a context, or an example. Given features associated with a particular instance, context, for example, ML model 367 can output a prediction for that instance, context, or example. For example, based on previous observed phone calls to an IVR system, ML model 367 may determine features of the previous observed phone calls, contextual information about the devices used to place the previous phone calls, etc. and generate rules for predicting what might happen during a future phone call to the IVR system, given a similar context.

ML model 367 can be or include one or more of various different types of machine-learned models. In particular, in some implementations, ML model 367 can perform classification, regression, clustering, anomaly detection, recommendation generation, and/or other tasks. Examples of different types of machine-learned models include: classifier models such as, for example, linear classification models; quadratic classification models, and regression models such as, for example, simple linear regression models; multiple linear regression models; logistic regression models; stepwise regression models; multivariate adaptive regression splines; locally estimated scatterplot smoothing models; etc. Other types of models include decision tree-based models such as, for example, classification and/or regression trees; iterative dichotomiser 3 decision trees; C4.5 decision trees; chi-squared automatic interaction detection decision trees; decision stumps; conditional decision trees; etc., kernel machines, support vector machines, and instance-based learning models such as, for example, learning vector quantization models; self-organizing map models; locally weighted learning models; etc. In some implementations, ML model 367 can be or include one or more nearest neighbor models such as, for example, k-nearest neighbor classifications models; k-nearest neighbors regression models; etc., Bayesian models such as, for example, naïve Bayes models; Gaussian naïve Bayes models; multinomial naïve Bayes models; averaged one-dependence estimators; Bayesian networks; Bayesian belief networks; hidden Markov models; etc.

In some implementations, ML model 367 can be or include one or more artificial neural networks (also referred to simply as neural networks) including neural networks that include multiple layers, or so called "deep" networks, feed forward networks, recurrent neural networks including long short-term (LSTM) recurrent neural networks; gated recurrent units; bi-direction recurrent neural networks; continuous time recurrent neural networks; neural history compressors; echo state networks; Elman networks; Jordan networks; recursive neural networks; Hopfield networks; fully recurrent networks; sequence-to-sequence configurations; etc. In some implementations, ML model 367 can be or include one or more convolutional neural networks, generative networks such as, for example, generative adversarial or other forms of artificial neural networks such as, for example, deep Boltzmann machines; deep belief networks; stacked autoencoders; etc. Any of the neural networks described herein can be combined (e.g., stacked) to form more complex networks.

In some implementations, ML model 367 can provide output data in the form of one or more recommendations. For example, ML model 367 can be a recommendation system or engine. As an example, given input data that describes previous outcomes for certain entities (e.g., a score, ranking, or rating indicative of an amount of success or enjoyment), ML model 367 can output a suggestion or recommendation of one or more additional entities that, based on the previous outcomes, are expected to have a desired outcome (e.g., elicit a score, ranking, or rating indicative of success or enjoyment). As one example, given input data descriptive of a context of a computing device, such as computing device 110 of FIG. 1, a recommendation system, such as computing system 360, can output a suggestion or recommendation that a user traverse to a "call back node" of an IVR system, rather than a "speak to representative node" given a particular context (e.g., time of day) or based on an expected or actual wait time associated with the speak to representative node.

GUI control module 365 may rely on ML model 367 to infer additional information (i.e., similar to the additional information obtained directly from assistant module 364, IVR system 182, or telephone module 222) about a user of a computing device or IVR system. For example, ML model 367 may predict additional information about a user given inferences or rules developed from observations of past behavior of the user with regards to the IVR system or other IVR systems. In a similar way, ML model 367 may predict additional information about the user given inferences or rules developed from observations of past behavior of other user with regards to the IVR system or other IVR systems. ML model 367 may predict additional information about an IVR system given inferences or rules developed from observations of past phone calls to the IVR system or other IVR systems.

Figure 4:
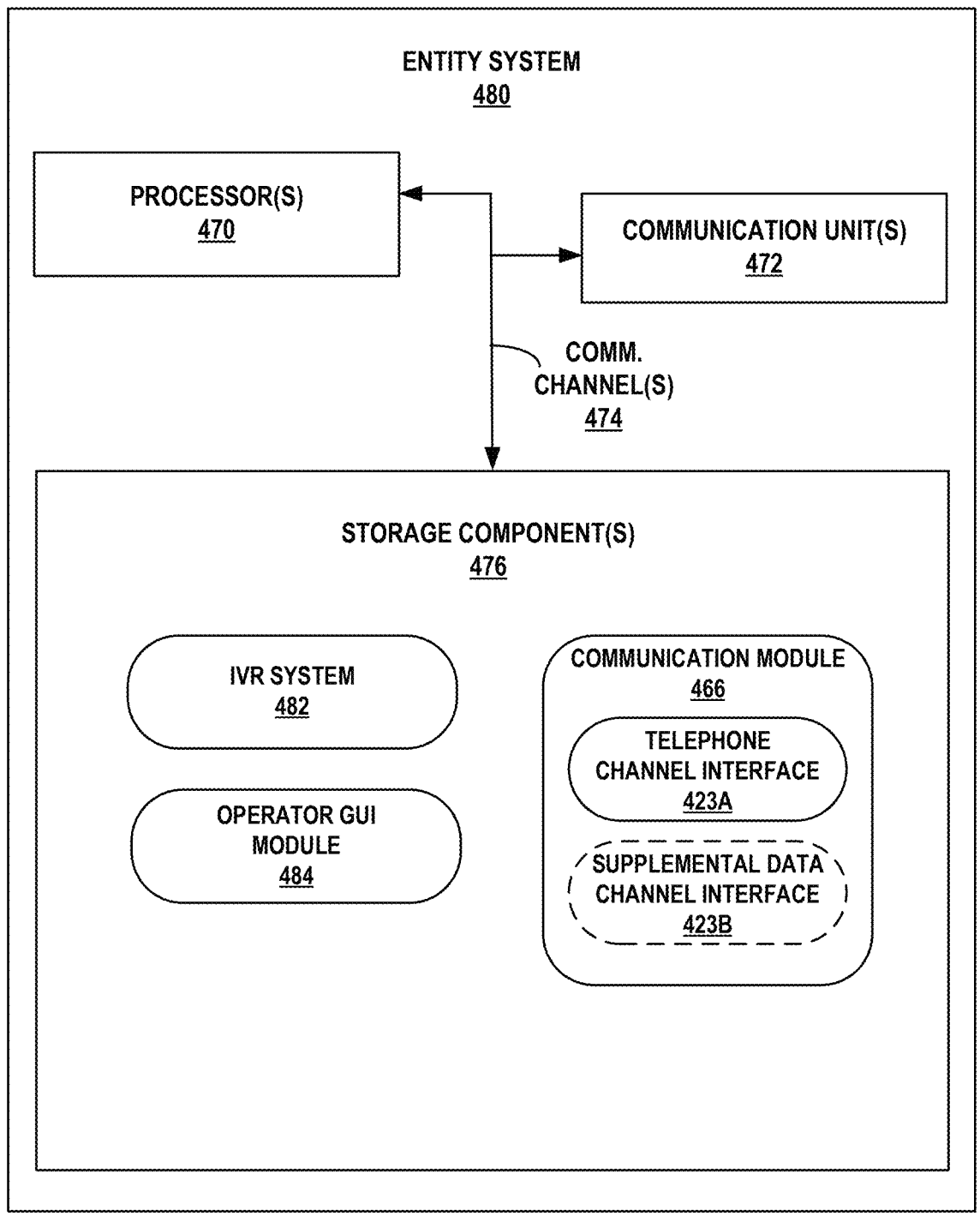
FIG. 4 is a block diagram illustrating an example entity system configured to provide an enhanced user interface to an IVR system, in accordance with one or more aspects of the present disclosure.

FIG. 4 is a block diagram illustrating an example entity system configured to provide an enhanced user interface to an interactive-voice-response system, in accordance with one or more aspects of the present disclosure. FIG. 4 is described in the context of FIG. 1. For example, entity system 480 of FIG. 4 is an example of entity system 180 of FIG. 1. FIG. 4 illustrates only one particular example of entity system 480, and many other examples of entity system 480 may be used in other instances and may include a subset of the components included in example entity system 480 or may include additional components not shown in FIG. 4.

Entity system 480 includes one or more processors 470, one or more communication units 472, and one or more storage components 476, all communicatively coupled via one or more communication channels 474. Processors 470, communication units 472, storage components 476, and communication channels 474 are similar to, respectively, processors 240, 370, communication units 242, 372, communication channels 250, 374, and storage components 248, 376, of computing device 210, computing system 360.

One or more storage components 476 include IVR system 482, communication module 466, and operator GUI module 484. Communication module 466 includes telephone channel interface 423A and supplemental data channel interface 423B. Communication module 466 is similar to communication module 366, in that communication module 466 is configured to control communication units 472 to manage one or more network communication interfaces of computing system 460.

Communication module 466 includes telephone channel interface 423A and, optionally includes supplemental data channel interface 423B (collectively "interfaces 423"). Interfaces 323 are similar to interfaces 223 of telephone module 222 of computing device 210 and interfaces 323 of computing system 360. That is, communication module 466 may send and/or receive telephone information via telephone channel interface 423A. Communication module 466 may send and/or receive other information via supplemental data channel interface 423B. Communication module 366 may exchange (send and/or receive) information via interfaces 423, on behalf of IVR system 482 and operator GUI module 484.

IVR system 482 and operator GUI module 484 proved an IVR service on behalf of entity system 480. Similar to IVR system 182 of entity system 180, by including some or all of the same functionality of IVR system 182, IVR system 482 controls the telephone functionality of the IVR service provided by entity system 480. Operator GUI module 484 provides a user interface into entity system 480 from which a user associated with entity system 480 can manage and interact with users of clients devices that have called into IVR system 482.

IVR system 482 manages a set of nodes (e.g., a tree or other hierarchical data structure) that are each associated with one or more functions of the IVR system. IVR system 482 uses rules to traverse from one node to a next node. The rules take as input, user inputs including DTMF codes, verbal responses, etc. and based on the user inputs, traverses from a current node to a next node. In some examples, each of the nodes of IVR system 482 includes one or more associated functions, operations, or features.

For example, a node may include a call-back function and a wait-on-hold option. If IVR system 482 recognizes an input that selects the call-back function, IVR system 482 may store a user's telephone number in a stack and may output (e.g., via telephone channel interface 423A or supplemental data channel interface 423B) an indication of an expected time of day when a user should expect a call-back. When the user's telephone number reaches the output of the stack, IVR system 482 may automatically connect to a computing device of the user. If IVR system 482 recognizes an input that selects the wait-on-hold function, IVR system 482 may store a user's telephone number in the stack of IVR system 482 until traversing to the next node where an operator associated with entity system 180 may remove the telephone number from the stack and engage with the user.

IVR system 482 may perform operations in response to a telephone communication data stream received at telephone channel interface 423A. In addition, and unlike other IVR systems, IVR system 482 may perform advanced functions using additional information gleamed from the telephone communication data stream, or in some example, using additional information obtained from supplemental data channel interface, i.e., outside of the telephone communication data stream.

For example, IVR system 482 may process an IMS data stream to perform operations based on traditional telephony commands and signals embedded in the data stream. In addition, IVR system 482 may decode hidden features, parameters, and messages encoded into the IMS data stream that enable IVR system 482 to perform more sophisticated operations. As an example, rather than require a user to input DTMF codes or voice prompts to input an account number, social security number, credit card number, address, telephone number, or any other personally identifiable or otherwise sensitive information using a phones keypad, IVR system 482 may obtain such sensitive or additional information by subscribing to an IVR system GUI service in which a provider system or client computing device transmits the other personally identifiable or otherwise sensitive information using one of interfaces 423. In this way, by utilizing a telephone communication network, transmission of sensitive information between an entity and client device may be more secure than other forms of transmission, e.g., a webpage interface or other less secure medium. Furthermore, by utilizing multiple channels (e.g., a telephone channel interface and a supplemental data channel interface), IVR system 482 may be less susceptible to hacking or snooping and therefore may be more secure than other IVR systems that exchange information primarily over a single, telephone communication channel.

Operator GUI module 484 provides a user interface into IVR system 482 from which an operator may engage with clients of IVR system 482. GUI module 484 benefits from the enhanced capabilities of IVR system 482 over other IVR system, in that with access to additional information about a client (e.g., obtained via either of interfaces 423) GUI module 484 can provide a more useful operator experience to a user of IVR system 482, to in-turn, provide a better customer experience (e.g., less frustrating, less time consuming, etc.) when a client connects to IVR system 482.

For example, supplemental data channel interface 423B may enable a client device, such as computing device 110, to provide payment information for a service requested via IVR system 482. The payment information may be stored by an electronic wallet of the client device and the electronic wallet may send to operator GUI module 484, via supplemental data channel interface 423B, payment information, for example, to approve or deny an order. As another example, a client device might connect with IVR system 482 to update an address of an account associated with entity system 480. Rather than require a user of the client device to provide DTMF codes or speak voice input to the operator of IVR system 482, the user can instead merely click on a GUI element at the client device to transmit an electronic address book entry to entity system 480. In response to receiving the electronic address book entry, operator GUI module 484 may cause an operator's display to present a graphical indication of the entry, from which the operator may read out-loud, via the telephone connection to the client device, the text of the entry so the user of the client device may verbally confirm the accuracy of the entry.

Figure 5:
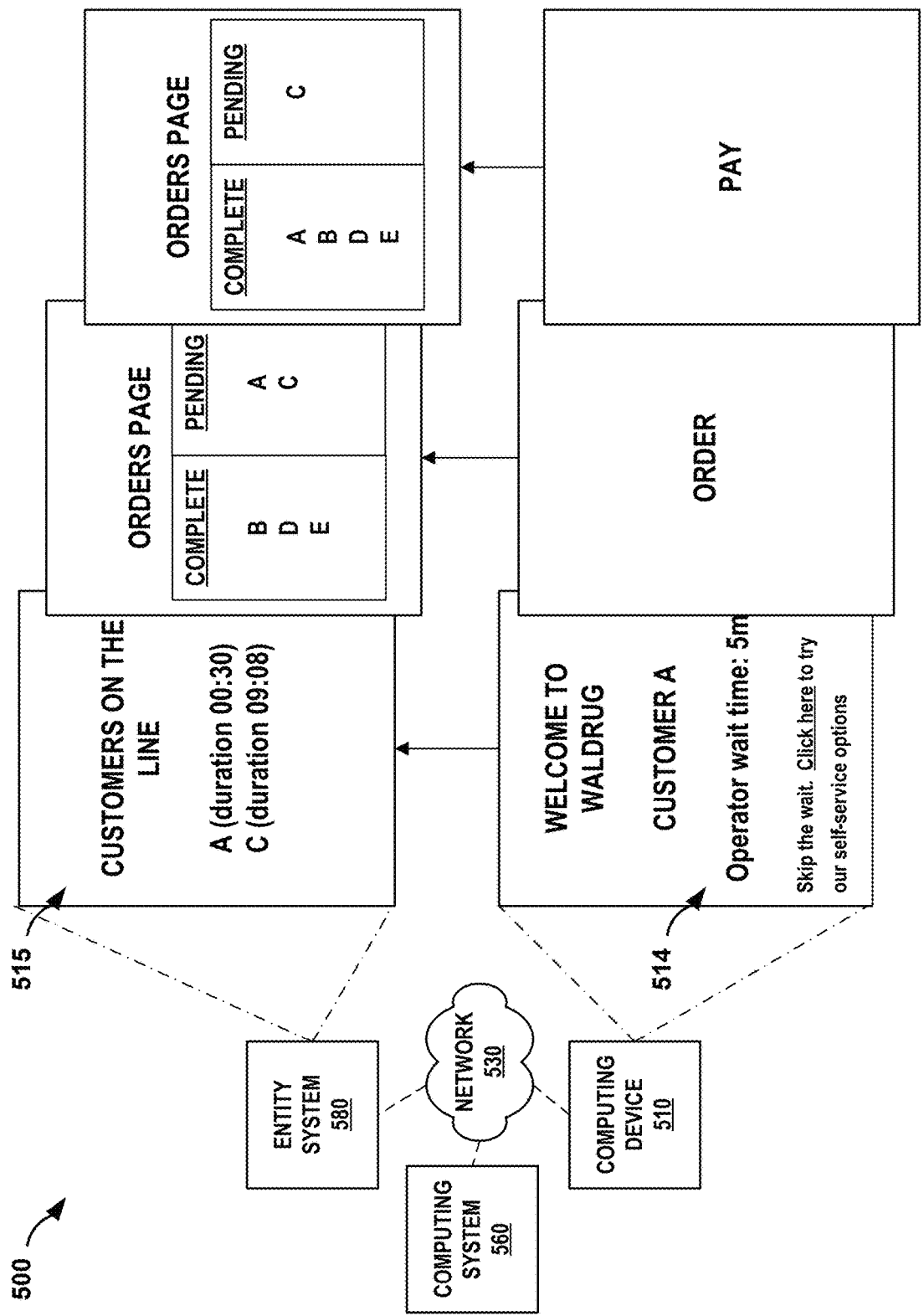
FIG. 5 is a conceptual diagram illustrating an example system configured to provide an enhanced user interface to an IVR system, in accordance with one or more aspects of the present disclosure.

FIG. 5 is a conceptual diagram illustrating an example system configured to provide an enhanced user interface to an interactive-voice-response system, in accordance with one or more aspects of the present disclosure. System 500 of FIG. 5 includes computing device 510, computing system 560, entity system 580, and network 530. Entity system 580 outputs, for display, operator user interface 5 5 and computing device 510 outputs, for display, user interface 514.

FIG. 5 is described in the context of FIGS. 1-4. For example, entity system 580 of FIG. 5 is an example of entity system 180, 480 of FIGS. 1 and 4. Network 530 of FIG. 5 is an example of network 130 of FIG. 1. Computing system 560 of FIG. 5 is an example of Computing system 160, 360 of FIGS. 1 and 3. Computing device 510 of FIG. 5 is an example of computing devices 110, 210 of FIGS. 1 and 2. FIG. 5 illustrates only one particular example of system 500, and many other examples of system 500 may be used in other instances and may include a subset of the components included in example system 500 or may include additional components not shown in FIG. 5.

In accordance with techniques of this disclosure, computing device 510 may initiate a telephone call into an IVR system of entity system 580. Rather than output an audible interface associated with the IVR system, computing device 510 may instead output, for display, user interface 514, i.e., an IVR system GUI associated with entity system 580. Computing device 510 may access a service provided by computing system 560 to obtain the instructions needed to reproduce user interface 514 locally on computing device 510.

In any event, an initial screen of user interface 514 includes a general welcome message that is indicative of a user's account name (e.g., "Customer A"). The components of system 500 may exchange additional information, beyond traditional types of telephony information, to provide user interface 514. For example, a telephone GUI module executing at computing system 560 may obtain from entity system 580 and/or an assistant service accessible to computing system 560, an indication of the user's account name as well as other types of additional information to customize the user experience. The telephone GUI module may send instructions to computing device 510 that cause a telephone module of computing device 510 to include aspects of the additional information at various parts of user interface 514.

Similar techniques for providing an IVR system GUI at a client computing device, such as computing device 510, may be applied to an entity system, such as entity system 580, to provide an operator-side IVR system GUI. For example, as can be seen from the juxta positioning in FIG. 5 of the screens of user interfaces 5 4 and 5 5, when computing device 5 0 is displaying the welcome screen associated with user interface 5 4, entity system is displaying, to an operator user, a main status screen associated with the IVR system of entity system 580. Just as computing device 510 may obtain additional information to update a status of user interface 514, entity system 580 may obtain additional information, including status information, caller information, account information, etc. to enable entity system 580 to track a user's progress through the nodes of the IVR system and display an indication of the progress within user interface 515.

For instance, after a user navigates to a "new order" node of the IVR system and selects, via user interface 514, an operation to place a new order, user interface 515 may display to the operator, an orders page showing customer A's order as being pending. Now at the "place a new order" node, a user selects, via user interface 514, an operation to pay for a new order. Computing system 510 may automatically send payment information to entity system 580 to process the new order. This payment information may be transmitted to entity system 580 via encoded messages within the telephone (e.g., IMS) data stream, or outside the data stream, for example, using a supplemental data channel established between the components of system 500.

In some examples, during the telephone call, computing device 510 may obtain, via computing system 560, status information associated with a particular option from a hierarchy of options of an IVR system of entity system 580. For example, using a supplemental data channel, or via the same telephone channel being used to conduct the telephone call, computing device 510 may obtain an indication of an expected wait time associated with the IVR system of entity system 580.

Computing device 510 may output, for display as part of user interface 514, a status indicator associated with the particular option. For example, computing device 510 may use the status information (e.g., expected wait time) to generate a graphical element that computing device 510 includes in user interface 514 to indicate to a user of computing device 510 the status information. In FIG. 5, computing device 510 displays text indicating that the expected wait time to speak to an operator is 5 m in user interface 514 as an indication of the status information. Other examples of status indicators exist, including other types of graphical elements, images, objects, using a variety of shapes, sizes, colors, animations, and the like.

In response to obtaining updated status information associated with the particular option, computing device 510 may updated, based on the updated status information associated with the particular option, the status indicator. For example, during the telephone call, computing device 510 may obtain, via computing system 560, updated status information associated with the particular option. For example, using a supplemental data channel, or via the same telephone channel being used to conduct the telephone call, computing device 5 0 may obtain an indication of an updated, expected wait time associated with the IVR system of entity system 580. For instance, due to one of the operators associated with entity system 580 having to go home early for the day, the expected wait time has increased from 5 m to 5 m due to the reduced bandwidth of entity system 580 to handle incoming calls. Computing device 510 may cause user interface 514 to display updated text indicating that the expected wait time to speak to an operator has changed to 0 m. In some examples, an updated status indicator may include updated text, graphical elements, images, objects, using a variety of shapes, sizes, colors, animations, and the like to make a user of computing device 510 aware of the change.

Figure 6:
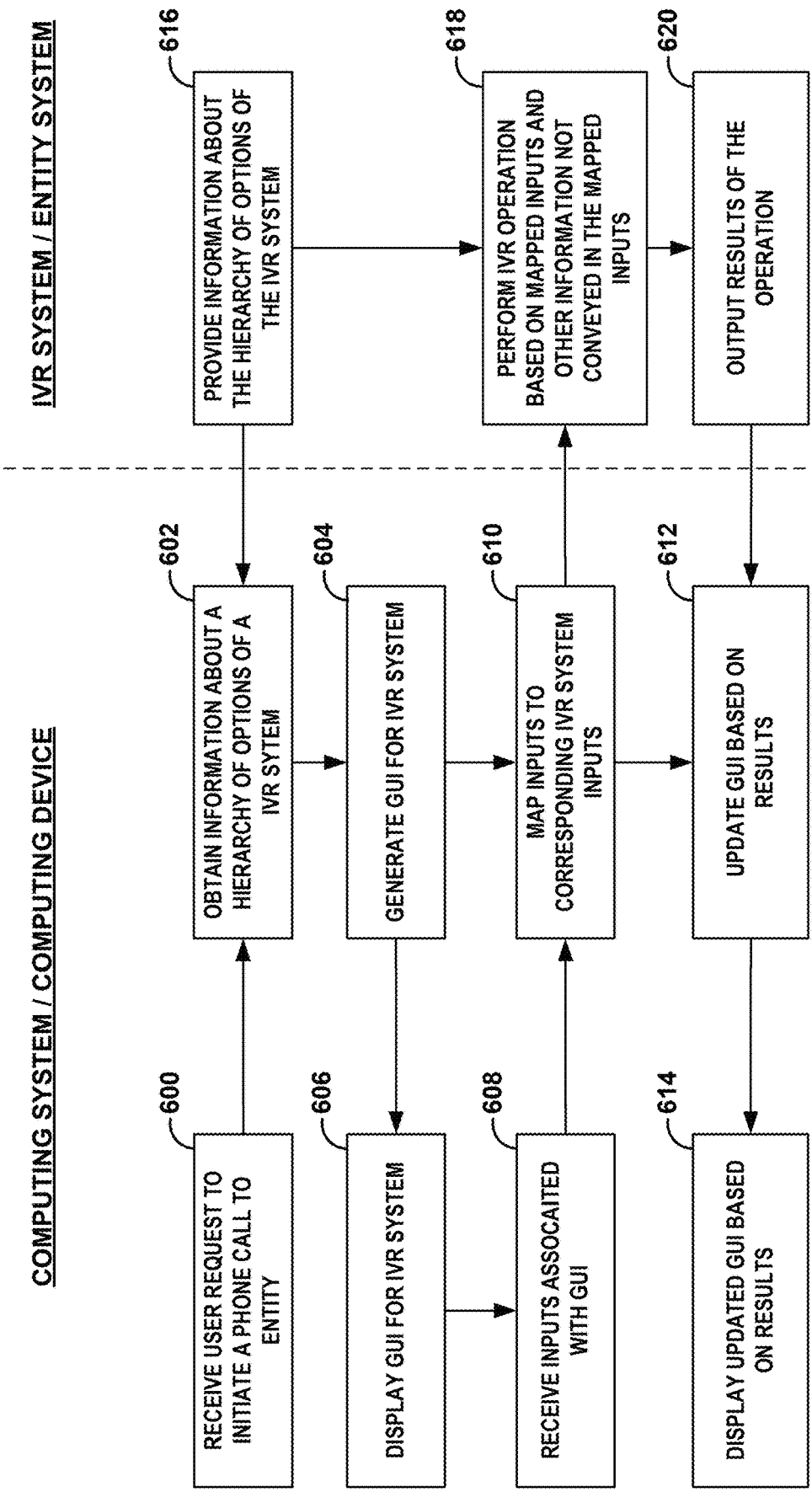
FIG. 6 is a flowchart illustrating example operations performed by an example computing system configured to provide an enhanced user interface to an IVR system, in accordance with one or more aspects of the present disclosure.

FIG. 6 is a flowchart illustrating example operations performed by an example computing system configured to provide an enhanced user interface to an interactive-voice-response system, in accordance with one or more aspects of the present disclosure. FIG. 6 is described in the context of FIG. 1. For example, operations 600 through 614 may be performed in by computing device 110, computing system 160, or a combination of computing device 110 and computing system 160 of system 100. Operations 616 through 620 may be performed by entity system 180 of system 100 of FIG. 1. Operations 600 through 620 may be performed in a different order or with more or fewer operations than as is shown in FIG. 6.

In accordance with the techniques of this disclosure, computing device 110 may receive a user request to initiate a phone call to entity system 180 that relies on IVR system 182 (600). For example, UI module 120 may detect, via UIC 112, user inputs that cause computing device 110 to launch a telephone application. In response to the user inputs, telephone module 122 may initiate a phone call to entity system 180.

In some examples, computing device 110 can be configured to display an IVR system GUI or not. For example, UI module 120 may cause UIC 112 to display a selectable element for toggling, on and off, access to the IVR system GUI service provided by computing system 160. Telephone module 122 may cause UIC to output, for display, user interface 114 in response to receiving information from UI module 120 about a user selection of an option of computing device 110 for enabling graphical user interfaces whenever conducting phone calls to IVR systems. In cases where the user does not select this option, computing device 110 may display a default telephone user interface including graphical indication of a keypad, and the like. However, in cases where the user does select the option for the IVR GUI, computing device 110 may perform operations 602 through 606 to display user interface 114 instead of the default telephone user interface of computing device 110.

Computing device 110 and/or computing system 160 may obtain information about a hierarchy of options associated with IVR system 182 of entity system 180 (602). For example, telephone GUI module 162 of computing system 160 may request, from entity system 180, a map of the nodes of IVR system 182. Entity system 180 may responds to the request by providing information about the hierarchy of options of IVR system 182 (616).

In other examples, telephone GUI module 162 performs a series of calls to different nodes of IVR system 182 to automatically generate the map of IVR system 182. And in other examples, telephone GUI module 162 may obtain information about the options associated with IVR system 182 to generate a map of the nodes of IVR system 182 based on information collected from other telephone GUI modules executing at other computing systems. In some cases, telephone GUI module 162 may execute a machine-learned model to predict information about options associated with IVR system 182.

Computing device 110 and/or computing system 160 may generate a GUI for IVR system 182 (604). For example, telephone GUI module 162 may populate a GUI template with information about the different options available for each node of IVR system 182, functions associated with the nodes of IVR system 182, as well as additional information about a user of computing device 110, computing device 110, or the user's account associated with entity system 180. Telephone GUI module 162 may organize elements of the GUI based on learned user preferences (e.g. of the user of computing device 110 or other users of other computing devices). Telephone GUI module 162 may populate the GUI with information predicted based on features of previously generated IVR system GUI.

Computing device 110 may output, for display, user interface 1141 for navigating the hierarchy of options associated with IVR system 182 (606). For example, telephone module 222 of computing device 110 may obtain from telephone module 162, instructions for rendering user interface 4 at UIC 112. Telephone module 222 may process the instructions and command UI module 120 to display user interface 4 at UIC 112.

In some examples, telephone module 222 suppresses, or selectively enables, aspects of the audible interface associated with IVR system 182 being output by IVR system 182. For example, computing device 110 may receive, using telephone module 222, audio associated with IVR system 182 while displaying user interface 114. Sometimes, telephone module 222 may cause computing device 110 to refrain from outputting at least some of the audio associated with IVR system 182 while user interface 113 is output for display. For example, when telephone module 222 recognizes a machine generated voice or a list of menu options being read aloud, telephone module 222 may suppress the audio since the user may rather interact with user interface 114.

During the telephone call, responsive to detecting an unrecorded human voice from the audio associated with IVR system 182, telephone module 222 may cause computing device 110 to output, via UIC 112, at least a portion of the audio associated with IVR system 182 that includes the unrecorded human voice. In other words, if a human operator gets on the line during a communication session between IVR system 182 and computing device 110, computing device 110 may automatically refrain from suppressing the audio interface of IVR system 182. In such a case, telephone module 222 may cease displaying user interface 114 or may continue displaying user interface 114. For instance, an operator may intervene during an IVR session with computing device 110 in response to receiving a command requesting assistance in placing an order. After answering a customer's questions, the customer may click within user interface 114 to send a payment for the order. An electronic payment service accessible from computing device 110 may transfer money to the user's account with entity system 180. When the payment goes through, the operator may speak over the telephone to confirm payment was received.

Computing device 110 may receive one or more user inputs associated with user interface 114 (608). For example, a user may select an operation presented in user interface 114, such as the check account option for shipping status of an order that is pending but has not been shipped. Telephone GUI module 162 may include the information about pending and shipped orders in user interface 114, for example, by interacting with an assistant service executing at computing device 110 that tracks orders placed by the user and tracks their shipping status.

However, in this example, the assistant service does not contain information about a pending order's status, because the order is still in the hands of entity system 180. As such, telephone module 222 requests additional information about the pending order from IVR system 182.

Computing device 110 and/or computing system 160 may map, user inputs associated with user interface 114, to corresponding IVR system inputs (610). For example, telephone module 222 may send an indication of the user inputs to telephone GUI module 162 for interpretation and incorporation into the telephone communication stream between computing device 110 and entity system 180. Telephone GUI module 162 may convert the one or more user inputs associated with user interface 114 to one or more corresponding inputs recognized by IVR system 182. Telephone GUI module 162 may send telephone module 222 information to include in the telephone data stream to command IVR system 182 to navigate to the order status node of IVR system 182. In addition to providing the node navigation command, telephone GUI module 162 may send to telephone module 222 other information that IVR system 182 may need to process the command. For example, as telephone GUI module 162 has information about a particular order (e.g., order number, account number of a user, or other information required by IVR system 182 to execute the command), telephone GUI module 162 may send the other information to telephone module 222, for further inclusion in the IMS data stream or for sending via a different communication channel between computing device 110 and entity system 180. In any event, computing device 110 may output, to entity system 180, an indication of the one or more corresponding inputs and other information required by the entity to perform an operation in response to the one or more corresponding inputs.

Entity system 180 may perform an IVR operation based on mapped inputs and other information not conveys in the mapped inputs (618). For example, IVR system 182 may navigate to the order status node of IVR system 182. IVR system 182 may feed the information about the particular order (e.g., order number, account number of a user, or other information) obtained from computing device 110 (e.g., embedded in the IMS data stream or received via a supplemental data channel).

Using the additional information about the particular order, IVR system 182 may perform an order status look-up operation to obtain information about a pending order, without requiring the user of computing device 110 or an operator of IVR system 182, from ever having to provide any inputs specifying the particular order.

Entity system 180 may output results of the operation (620). For example, entity system 180 may return to telephone module 222, within the telephone data stream or via the supplemental data channel, an indication of the results of the order status look-up operation.

Computing device 110 or computing system 160 may update user interface 114 based on additional information received computing device 110, in response to outputting the indication of the one or more corresponding inputs and the other information (612). For example, using the information obtained from entity system 180, telephone GUI module 162 may generate an order status page of user interface 114 from which the user of computing device 110 can view information about where the order is in the processing cycle at the entity.

Computing device 110 may display an updated user interface 114 based on the results (614). For example, telephone module 222 may receive updated instructions from telephone GUI module 162 that cause user interface 114 to reflect the information about where the order is in the processing cycle at the entity.

In some examples, telephone calls may be dropped or otherwise interrupted (e.g., due to human error, technical errors, environmental factors, etc.). To improve a user experience, telephone GUI module 162 and telephone module 222 may perform operations to save a user's state relative to IVR system 182, automatically. For example, telephone module 222 may store a session identifier associated with a telephone call to IVR system 182. The session identifier may be embedded in the IMS stream and also stored by entity system 180. Entity system 180 and telephone module 222 may store respective records of a telephone call including information such as: current node, additional information, previous nodes, previous selections, and other information about the call. This way, responsive to an interrupt in a telecommunication session between entity system 180 and computing device 110, telephone module 122 and IVR system 182 may automatically reestablish, using the session identifier, the telecommunication session. Telephone module 222 may cause a state of user interface 114, after the telecommunication session is reestablished to correspond to a state of user interface 114 prior to the interrupt.

Clause 1. A method comprising: receiving, by a mobile device, a user request to initiate a phone call to an entity that relies on an interactive-voice-response system; obtaining information about a hierarchy of options associated with the interactive-voice-response system; outputting, by the mobile device, for display, a graphical user interface for navigating the hierarchy of options associated with the interactive-voice-response system; receiving, by the mobile device, one or more user inputs associated with the graphical user interface; converting the one or more user inputs associated with the graphical user interface to one or more corresponding inputs recognized by the interactive-voice-response system; outputting, by the mobile device, to the entity, an indication of the one or more corresponding inputs and other information required by the entity to perform an operation in response to the one or more corresponding inputs; and updating the graphical user interface based on additional information received by the mobile device, in response to outputting the indication of the one or more corresponding inputs and the other information.

Clause 2. The method of clause 1, wherein the other information required by the entity to perform the operation comprises user specific information maintained by a digital assistant executing at the mobile device or a mobile payment application executing at the mobile device.

Clause 3. The method of any of clauses 1 or 2, wherein the other information required by the entity to perform the operation comprises user specific information other than a name of a user or a telephone number associated with the user.

Clause 4. The method of any of clauses 1-3, further comprising: during the phone call: obtaining status information associated with a particular option from the hierarchy of options; outputting, for display as part of the graphical user interface, a status indicator associated with the particular option; and in response to obtaining updated status information associated with the particular option, updating, based on the updated status information associated with the particular option, the status indicator.

Clause 5. The method of clause 4, wherein at least one of: the status information or the updated status information is obtained from a machine-learned model that is trained based on past phone calls between at least one of: the mobile device and the entity, or other mobile phones and the entity; or the status information or the updated status information is obtained from the entity.

Clause 6. The method of any of clauses 1-5, wherein outputting the graphical user interface for display comprises: detecting a user selection of an option of the mobile device for enabling the graphical user interface; and in response to detecting the user selection, outputting, the graphical user interface, for display, instead of a default telephone user interface of the mobile device.

Clause 7. The method of any of clauses 1-6, wherein: the indication of the one or more corresponding inputs is output to the entity via a first communication channel; and the other information required by the entity to perform the operation in response to the one or more corresponding inputs is output to the entity via a second communication channel.

Clause 8. The method of clause 7, wherein the first communication channel comprises the second communication channel and uses an Internet Protocol Multimedia Subsystem with Session Initiation Protocol.

Clause 9. The method of any of clauses 1-8, wherein at least one of: the information about the hierarchy of options is obtained from the entity via a communication channel; or the additional information is received via the communication channel or from a machine-learned model that learns the additional information.

Clause 10. The method of any of clauses 1-9, wherein outputting, for display, the graphical user interface for navigating the hierarchy of options associated with the interactive-voice-response interface comprises: receiving, by the mobile device, audio associated with the interactive-voice-response interface while the graphical user interface is output for display; and refraining, by the mobile device, from outputting at least some of the audio associated with the interactive-voice-response interface while the graphical user interface is output for display.

Clause 11. The method of clause 10, further comprising: during the phone call: responsive to detecting an unrecorded human voice from the audio associated with the interactive-voice-response interface, outputting, by the mobile device, at least a portion of the audio associated with the interactive-voice-response interface that includes the unrecorded human voice.

Clause 12. The method of any of clauses 1-11, further comprising: storing a session identifier of the phone call; responsive to an interrupt in the telecommunication session, automatically reestablishing, using the session identifier, the telecommunication session, wherein a state of the graphical user interface after the telecommunication session is reestablished corresponds to a state of the graphical user interface prior to the interrupt.

Clause 13. A computing system comprising at least one processor configured to perform any of the methods of clauses 1-12.

Clause 14. A computing system comprising means for performing any of the methods of clauses 1-12.

Clause 15. A computer-readable storage medium comprising instructions that, when executed, cause at least one processor to perform any of the methods of clauses 1-12. By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Tt should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASTCs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (TC) or a set of TCs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments have been described. These and other embodiments are within the scope of the following claims.

What is claimed is:

1. A method comprising:
   receiving, by a mobile device, a user request to initiate a phone call to an entity that relies on an interactive-voice-response system;
   determining, during the phone call, information about a hierarchy of options, wherein the hierarchy of options maps to a menu hierarchy of the interactive-voice-response system, and wherein the information comprises one or more wait times associated with respective nodes of the interactive-voice-response system, wherein the one or more wait times comprise expected wait times as predicted by a machine learning model trained on previously observed wait times for traversal of nodes of a portion of the interactive-voice-response system;
   outputting, by the mobile device, for display, a graphical user interface for navigating the hierarchy of options that maps to the menu hierarchy of the interactive-voice-response system, wherein the outputting comprises providing, during the phone call and based on the one or more wait times, an alternative node option of the hierarchy of options;
   receiving, by the mobile device, one or more user inputs associated with the hierarchy of options;
   converting the one or more user inputs associated with the hierarchy of options to one or more corresponding mapped inputs recognized by the menu hierarchy of the interactive-voice-response system;
   outputting, by the mobile device, to the entity, an indication of the one or more corresponding mapped inputs via a first communication channel, and outputting other information required by the entity to perform an operation in response to the one or more corresponding mapped inputs via a second communication channel, wherein the first communication channel comprises the second communication channel and uses an Internet Protocol Multimedia Subsystem with Session Initiation Protocol; and
   updating the graphical user interface based on additional information received from the entity and by the mobile device, in response to outputting the indication of the one or more corresponding mapped inputs and the other information.

2. The method of claim 1, wherein the other information required by the entity to perform the operation comprises user specific information maintained by a digital assistant executing at the mobile device or a mobile payment application executing at the mobile device.

3. The method of claim 1, wherein the other information required by the entity to perform the operation comprises user specific information other than a name of a user or a telephone number associated with the user.

4. The method of claim 1, further comprising:
   during the phone call:
      obtaining status information associated with a particular option from the hierarchy of options;
      outputting, for display as part of the graphical user interface, a status indicator associated with the particular option; and
      in response to obtaining updated status information associated with the particular option, updating, based on the updated status information associated with the particular option, the status indicator.

5. The method of claim 4, wherein the status information or the updated status information is obtained from the machine-learned model having been trained based on past phone calls between at least one of: the mobile device and the entity, or other mobile phones and the entity.

6. The method of claim 1, wherein outputting the graphical user interface for display comprises:
   detecting a user selection of an option of the mobile device for enabling the graphical user interface; and
   in response to detecting the user selection, outputting, the graphical user interface, for display, instead of a default telephone user interface of the mobile device.

7. The method of claim 1, further comprising:
   outputting another indication of one or more corresponding mapped inputs via a third communication channel; and
   outputting additional other information required by the entity to perform the operation in response to the one or more corresponding mapped inputs via a fourth communication channel.

8. The method of claim 7, wherein the third communication channel is different from the fourth communication channel.

9. The method of claim 1, wherein at least one of:
   the information about the hierarchy of options is obtained from the entity via a communication channel; or
   the additional information is received via the communication channel or from a machine-learned model that learns the additional information.

10. The method of claim 1, wherein outputting, for display, the graphical user interface for navigating the hierarchy of options associated with the interactive-voice-response interface comprises:

receiving, by the mobile device, audio associated with the interactive-voice-response interface while the graphical user interface is output for display; and refraining, by the mobile device, from outputting at least some of the audio associated with the interactive-voice-response interface while the graphical user interface is output for display.

11. The method of claim 10, further comprising:

during the phone call:

responsive to detecting an unrecorded human voice from the audio associated with the interactive-voice-response interface, outputting, by the mobile device, at least a portion of the audio associated with the interactive-voice-response interface that includes the unrecorded human voice.

12. The method of claim 1, further comprising:

storing a session identifier of the phone call;

responsive to an interrupt in the telecommunication session, automatically reestablishing, using the session identifier, the telecommunication session, wherein a state of the graphical user interface after the telecommunication session is reestablished corresponds to a state of the graphical user interface prior to the interrupt.

13. The method of claim 1, further comprising:

applying the trained machine-learned model to predict a path through one or more nodes of the hierarchy of options that maps to the interactive-voice-response system, the machine-learned model having been trained on previously traversed paths through the interactive-voice-response system; and providing, by the trained machine-learned model, a recommendation to navigate the hierarchy of options based on the predicted path, and wherein the receiving of the one or more user inputs associated with the hierarchy of options is performed in response to the recommendation.

14. The method of claim 1, wherein the other information comprises contextual information associated with the user, the mobile device, or both.

15. A mobile device comprising at least one processor configured to:

receive a user request to initiate a phone call to an entity that relies on an interactive-voice-response system;

determine, during the phone call, information about a hierarchy of options, wherein the hierarchy of options maps to a menu hierarchy of the interactive-voice-response system, and wherein the information comprises one or more wait times associated with respective nodes of the interactive-voice-response system, wherein the one or more wait times comprise expected wait times as predicted by a machine learning model trained on previously observed wait times for traversal of nodes of a portion of the interactive-voice-response system;

output, for display, a graphical user interface for navigating the hierarchy of options that maps to the menu hierarchy of the interactive-voice-response system, wherein the output comprises providing, during the phone call and based on the one or more wait times, an alternative node option of the hierarchy of options;

receive one or more user inputs associated with the hierarchy of options;

convert the one or more user inputs associated with the hierarchy of options to one or more corresponding mapped inputs recognized by the menu hierarchy of the interactive-voice-response system;

output, to the entity, an indication of the one or more corresponding mapped inputs via a first communication channel, and output other information required by the entity to perform an operation in response to the one or more corresponding mapped inputs via a second communication channel, wherein the first communication channel comprises the second communication channel and uses an Internet Protocol Multimedia Subsystem with Session Initiation Protocol; and in response to outputting the indication of the one or more corresponding mapped inputs and the other information, update the graphical user interface based on additional information received from the entity and by the mobile device.

16. The mobile device of claim 15, the at least one processor further configured to:

during the phone call:

obtain status information associated with a particular option from the hierarchy of options;

output, for display as part of the graphical user interface, a status indicator associated with the particular option; and in response to obtaining updated status information associated with the particular option, update, based on the updated status information associated with the particular option, the status indicator.

17. The mobile device of claim 15, wherein the output, for display, of the graphical user interface for navigating the hierarchy of options associated with the interactive-voice-response interface comprises:

receive audio associated with the interactive-voice-response interface while the graphical user interface is output for display; and refrain from outputting at least some of the audio associated with the interactive-voice-response interface while the graphical user interface is output for display.

18. The mobile device of claim 17, the at least one processor further configured to:

during the phone call:

responsive to a detection of an unrecorded human voice from the audio associated with the interactive-voice-response interface, output at least a portion of the audio associated with the interactive-voice-response interface that includes the unrecorded human voice.

19. A computer-readable storage medium comprising instructions that, when executed, cause at least one processor of a mobile device to:

receive a user request to initiate a phone call to an entity that relies on an interactive-voice-response system;

determine, during the phone call, information about a hierarchy of options, wherein the hierarchy of options maps to a menu hierarchy of the interactive-voice-response system, and wherein the information comprises one or more wait times associated with respective nodes of the interactive-voice-response system, wherein the one or more wait times comprise expected wait times as predicted by a machine learning model trained on previously observed wait times for traversal of nodes of a portion of the interactive-voice-response system;

output, for display, a graphical user interface for navigating the hierarchy of options that maps to the menu hierarchy of the interactive-voice-response system, wherein the output comprises providing, during the phone call and based on the one or more wait times, an alternative node option of the hierarchy of options;

receive one or more user inputs associated with the hierarchy of options;

convert the one or more user inputs associated with the hierarchy of options to one or more corresponding mapped inputs recognized by the menu hierarchy of the interactive-voice-response system;

output, to the entity, an indication of the one or more corresponding mapped inputs via a first communication channel, and output other information required by the entity to perform an operation in response to the one or more corresponding mapped inputs via a second communication channel, wherein the first communication channel comprises the second communication channel and uses an Internet Protocol Multimedia Subsystem with Session Initiation Protocol; and in response to outputting the indication of the one or more corresponding mapped inputs and the other information, update the graphical user interface based on additional information received from the entity and by the mobile device.

20. The computer-readable storage medium of claim 19, the computer-readable storage medium comprising further instructions that, when executed, cause the at least one processor of the mobile device to:

during the phone call:

obtain status information associated with a particular option from the hierarchy of options;

output, for display as part of the graphical user interface, a status indicator associated with the particular option; and in response to obtaining updated status information associated with the particular option, update, based on the updated status information associated with the particular option, the status indicator.

21. The computer-readable storage medium of claim 19, wherein the output, for display, of the graphical user interface for navigating the hierarchy of options associated with the interactive-voice-response interface comprises:

receive audio associated with the interactive-voice-response interface while the graphical user interface is output for display; and refrain from outputting at least some of the audio associated with the interactive-voice-response interface while the graphical user interface is output for display.

22. The computer-readable storage medium of claim 21, the computer-readable storage medium comprising further instructions that, when executed, cause the at least one processor of the mobile device to:

during the phone call:

responsive to a detection of an unrecorded human voice from the audio associated with the interactive-voice-response interface, output at least a portion of the audio associated with the interactive-voice-response interface that includes the unrecorded human voice.

* * * * *